US011943590B2

(12) United States Patent
Ali et al.

(10) Patent No.: US 11,943,590 B2
(45) Date of Patent: Mar. 26, 2024

(54) INTEGRATED NOISE REDUCTION

(71) Applicant: Cochlear Limited, Macquarie University (AU)

(72) Inventors: Randall Ali, Katholieke Universiteit Leuven (BE); Toon Van Waterschoot, Katholieke Universiteit Leuven (BE); Marc Moonen, Katholieke Universiteit Leuven (BE)

(73) Assignee: Cochlear Limited, Macquarie University (AU)

( * ) Notice: Subject to any disclaimer, the term of this patent is extended or adjusted under 35 U.S.C. 154(b) by 207 days.

(21) Appl. No.: 17/261,778

(22) PCT Filed: Aug. 20, 2019

(86) PCT No.: PCT/IB2019/057011
§ 371 (c)(1),
(2) Date: Jan. 20, 2021

(87) PCT Pub. No.: WO2020/044166
PCT Pub. Date: Mar. 5, 2020

(65) Prior Publication Data

US 2021/0306743 A1 Sep. 30, 2021

Related U.S. Application Data

(60) Provisional application No. 62/723,157, filed on Aug. 27, 2018.

(51) Int. Cl.

| | |
|---|---|
| ***H04R 3/00*** | (2006.01) |
| ***H04R 5/04*** | (2006.01) |
| ***H04S 7/00*** | (2006.01) |

(52) U.S. Cl.
CPC ............... *H04R 3/005* (2013.01); *H04R 5/04* (2013.01); *H04S 7/302* (2013.01); *H04S 2420/01* (2013.01)

(58) Field of Classification Search
CPC ..................................................... H04R 3/005
See application file for complete search history.

(56) References Cited

U.S. PATENT DOCUMENTS

| | | | |
|---|---|---|---|
| 2004/0175006 | A1 | 9/2004 | Kim et al. |
| 2007/0003071 | A1 | 1/2007 | Slapak et al. |
| 2009/0202091 | A1 | 8/2009 | Pedersen et al. |
| 2011/0103626 | A1 | 5/2011 | Bisgaard et al. |
| 2012/0239385 | A1 | 9/2012 | Hersbach et al. |

OTHER PUBLICATIONS

Ali, R., et al., "A contingency multi-microphone noise reduction strategy based on linearly constrained multi-channel wiener filtering," in Proc. 2016 Int. Workshop Acoustic Signal Enhancement (IWAENC '16), Xi'an, China, Sep. 2016, pp. 1-4.

(Continued)

*Primary Examiner* — Ping Lee
(74) *Attorney, Agent, or Firm* — Edell, Shapiro & Finnan, LLC

(57) ABSTRACT

Presented herein are techniques for generated an integrated estimate of a target sound (e.g., speech) in sound signals received by at least a local microphone array of a device. In embodiments, the integrated estimate may be generated based on sound signals received by the at least a local microphone array of a device and at least one external microphone.

20 Claims, 14 Drawing Sheets

(56) References Cited

OTHER PUBLICATIONS

Ali, R., et al., "A noise reduction strategy for hearing devices using an external microphone," 2017, ESAT-STADIUS Technical Report TR 17-37, KU Leuven, Belgium (5 pages).
Ali, R., et al., "An integrated approach to designing an mvdr beamformer for speech enhancement," 2017, ESAT-STADIUS Technical Report, KU Leuven, Belgium (14 pages).
Ali, R., et al., "Completing the RTF vector for an MVDR beamformer as applied to a local microphone array and an external microphone" submitted to Proc. 2018 Int. Workshop Acoustic Signal Enhancement (IWAENC '18) (5 pages).
Ali, R., et al., "Generalised sidelobe canceller for noise reduction in hearing devices using an external microphone," Proc. 2018 IEEE Int. Conf. Acoust., Speech, Signal Process. (ICASSP), Calgary, AB, Canada, Apr. 2018 (5 pages).
Bertrand, A., and. M Moonen, "Robust distributed noise reduction in hearing aids with external acoustic sensor nodes," EURASIP J. Adv. Signal Process. 2009, 530435 (2009) (14 pages).
Capon, J., "High-resolution frequency-wavenumber spectrum analysis," Proc. of the IEEE, vol. 57, No. 8, pp. 1408-1418, 1969.
Cohen, I., "Relative Transfer Function Identification Using Speech Signals," IEEE Trans. Speech Audio Process., vol. 12, No. 5, pp. 451-459, 2004.
Courtois, G.A., "Spatial hearing rendering in wireless microphone systems for binaural hearing aids," Ph.D. thesis, E' cole polytechnique fe'de'rale de Lausanne (EPFL), Lausanne, 2016 (261 pages).
Cvijanović, N., et al., "Speech enhancement using a remote wireless microphone," IEEE Trans. on Consumer Electronics, vol. 59, No. 1, pp. 167-174, Feb. 2013.
Er, M.H., and A. Cantoni, "Derivative Constraints for Broad-band Element Space Antenna Array Processors," IEEE Trans. Acoust., Speech, Signal Process., vol. ASSP-31, No. 6, pp. 1378-1393, 1983.
Golub, G.H., "Some Modified Matrix Eigenvalue Problems," SIAM Review, vol. 15, No. 2, pp. 318-334, 1973.
Gößling, N., et al., "Comparison of RTF Estimation Methods between a Head-Mounted Binaural Hearing Device and an External Microphone," in Proc. International Workshop on Challenges in Hearing Assistive Technology (CHAT), Stockholm, Sweden, Aug. 2017, pp. 101-106.
Greenberg, J.E., and P.M. Zurek, "Evaluation of an adaptive beamforming method for hearing aids," J. Acoust. Soc. Amer., vol. 91, No. 3, pp. 1662-1676, 1992.
Griffiths, L. and C. Jim, "An alternative approach to lineady constrained adaptive beamforming," IEEE Trans. Antennas Propag., vol. 30, No. 1, pp. 27-34, 1982.
Kates, J.M., and M.R. Weiss, "A comparison of hearing-aid array-processing techniques," J. Acoust. Soc. Amer., vol. 99, No. 5, pp. 3138-3148, 1996.
Markovich-Golan, S. and S. Gannot, "Performance analysis of the covariance subtraction method for relative transfer function estimation and comparison to the covariance whitening method," in Proc. 2015 IEEE Int. Conf. Acoust., Speech, Signal Process. (ICASSP '15), Brisbane, Australia, Apr. 2015, pp. 544-548.
Markovsky, I., Low Rank Approximation: Algorithms, Implementation, Applications, Springer, 2012 (260 pages).
Serizel, R., et al., "Low-rank Approximation Based Multichannel Wiener Filter Algorithms for Noise Reduction with Application in Cochlear Implants," IEEE/ACM Trans. Audio Speech Lang. Process., vol. 22, No. 4, pp. 785-799, 2014.
Spriet, A., et al., "A Unification of Adaptive Multi-Microphone Noise Reduction Systems," in Proc. Int. Workshop Acoust. Echo Noise Control (IWAENC), Paris, France, Sep. 2006 (5 pages).
Spriet, A., et al., "Speech understanding in background noise with the two-microphone adaptive beamformer BEAM in the Nucleus Freedom Cochlear Implant System.," Ear and hearing, vol. 28, No. 1, pp. 62-72, 2007.
Szurley, J., et al., "Binaural noise cue preservation in a binaural noise reduction system with a remote microphone signal," IEEE/ACM Trans. Audio Speech Lang. Process., vol. 24, No. 5, pp. 952-966, 2016.
Van Veen, B.D., and K.M. Buckley, "Beamforming: a versatile approach to spatial filtering," in IEEE ASSP Magazine, vol. 5, No. 2, pp. 4-24, Apr. 1988.
Yee, D., et al., "A Noise Reduction Post-Filter for Binaurally-linked Single-Microphone Hearing Aids Utilizing a Nearby External Microphone," IEEE/ACM Trans. Audio Speech Lang. Process., vol. 26, No. 1, pp. 5-18, 2018.
Search Report and the Written Opinion in corresponding International Application No. PCT/IB2019/057011, dated Dec. 26, 2019, 7 pages.
Microchip Technology, Inc., "Crystal-less™ Configurable Two-Output Clock Generator", DSC2311, Jun. 23, 2016, 18 pages.

FIG. 9

TABLE 1

TABLE 1: SUMMARY OF NOISE REDUCTION STRATEGIES RESULTING FROM (57) FOR DIFFERENT TUNINGS

| MVDR | $\alpha$ | $\beta$ | NOISE REDUCTION STRATEGY |
|---|---|---|---|
| $MVDR_a$ | $\infty$ | $0$ | $MVDR_a$ WITH A PRIORI CONSTRAINT (25) |
| $MVDR_a$ | $0$ | $\infty$ | $MVDR_a$ WITH ESTIMATED QUANTITIES (31) |
| $MVDR_a$ | $\infty$ | $\infty$ | LCMV WITH BOTH A PRIORI AND ESTIMATED QUANTITIES FOR A LMA |
| $MVDR_a$ | $(0, \infty)$ | $(0, \infty)$ | $MVDR_a$ WITH A PROPRI AND ESTIMATED QUANTITIES (34) |
| $MVDR_{a,e}$ | $\infty$ | $0$ | $MVDR_{a,e}$ WITH A PRIORI CONSTRAINT (57) |
| $MVDR_{a,e}$ | $0$ | $\infty$ | $MVDR_{a,e}$ WITH ESTIMATED QUANTITIES (65) |
| $MVDR_{a,e}$ | $\infty$ | $\infty$ | LCMV WITH BOTH A PRIORI AND ESTIMATED QUANTITIES FOR A LMA+XMs |
| $MVDR_{a,e}$ | $(0, \infty)$ | $(0, \infty)$ | $MVDR_{a,e}$ WITH BOTH A PRIORI AND ESTIMATED QUANTITIES (70) |

INTEGRATED NOISE REDUCTION

BACKGROUND

Field of the Invention

The present invention generally relates to integrated noise reduction for devices having at least one local microphone array.

Related Art

Hearing loss is a type of sensory impairment that is generally of two types, namely conductive and/or sensorineural. Conductive hearing loss occurs when the normal mechanical pathways of the outer and/or middle ear are impeded, for example, by damage to the ossicular chain or ear canal. Sensorineural hearing loss occurs when there is damage to the inner ear, or to the nerve pathways from the inner ear to the brain.

Individuals who suffer from conductive hearing loss typically have some form of residual hearing because the hair cells in the cochlea are undamaged. As such, individuals suffering from conductive hearing loss typically receive an auditory prosthesis that generates motion of the cochlea fluid. Such auditory prostheses include, for example, acoustic hearing aids, bone conduction devices, and direct acoustic stimulators.

In many people who are profoundly deaf, however, the reason for their deafness is sensorineural hearing loss. Those suffering from some forms of sensorineural hearing loss are unable to derive suitable benefit from auditory prostheses that generate mechanical motion of the cochlea fluid. Such individuals can benefit from implantable auditory prostheses that stimulate nerve cells of the recipient's auditory system in other ways (e.g., electrical, optical and the like). Cochlear implants are often proposed when the sensorineural hearing loss is due to the absence or destruction of the cochlea hair cells, which transduce acoustic signals into nerve impulses. An auditory brainstem stimulator is another type of stimulating auditory prosthesis that might also be proposed when a recipient experiences sensorineural hearing loss due to damage to the auditory nerve.

SUMMARY

In one aspect, a method is provided. The method comprises: receiving sound signals with at least a local microphone array of a device, wherein the sound signals comprise at least one target sound; generating an a priori estimate of the at least one target sound in the received sound signals based on a predetermined location of a source of the at least one target sound; generating a direct estimate of the at least one target sound in the received sound signals based on a real-time estimate of a location of a source of the at least one target sound; and generating a weighted combination of the a priori estimate and the direct estimate, wherein the weighted combination is an integrated estimate of the target sound.

In another aspect, a device is provided. The device comprises: a local microphone array configured to receive sound signals, wherein the sound signals comprise at least one target sound; and one or more processors configured to: generate an a priori estimate of the at least one target sound in the received sound signals using only an a priori relative transfer function (RTF) vector generated from the received sound signals, generate a direct estimate of the at least one target sound in the received sound signals using only an a priori relative transfer function (RTF) vector generated from the received sound signals, and generate a weighted combination of the a priori estimate and the direct estimate, wherein the weighted combination is an integrated estimate of the target sound.

BRIEF DESCRIPTION OF THE DRAWINGS

Embodiments of the present invention are described herein in conjunction with the accompanying drawings, in which:

FIG. 9 is a table summarizing the various noise reduction strategies, in accordance with embodiments presented herein;

DETAILED DESCRIPTION

I. Introduction

Figure 1:
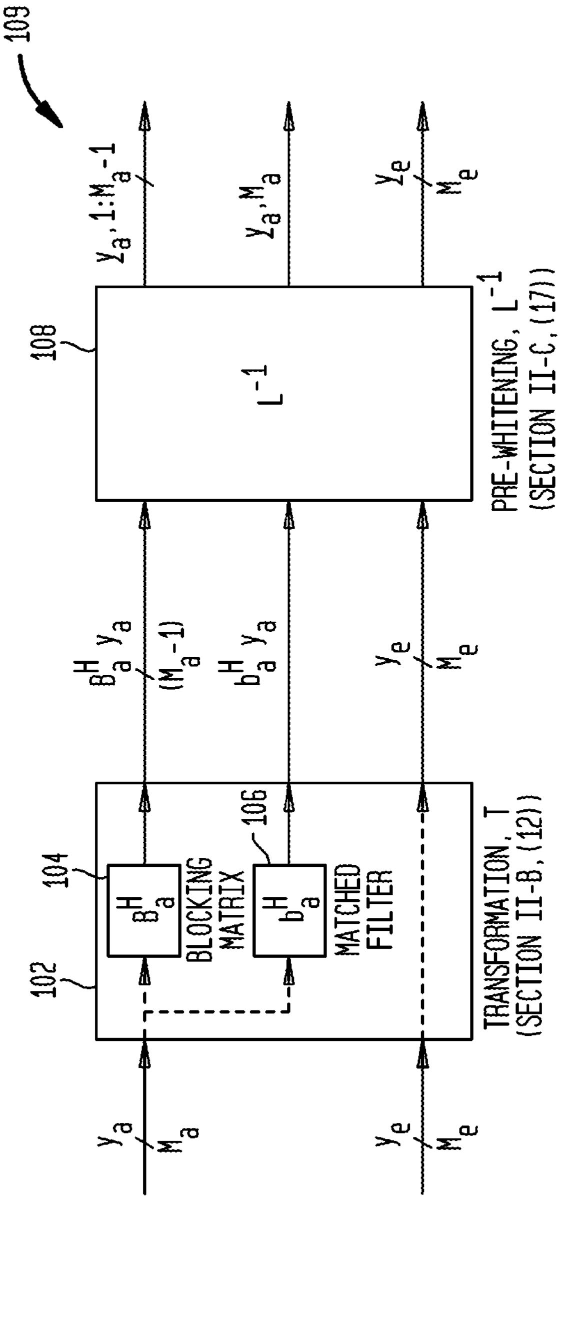
FIG. 1 is a functional block diagram illustrating the generation of pre-whitened transformed signals.

In devices having one or more microphone arrays, such as auditory prostheses (e.g., hearing aids, cochlear implants, bone conduction devices, etc.), multi-microphone noise reduction systems are used to preserve desired sounds (e.g., speech), while rejecting unwanted sounds (e.g., noise). In certain conventional noise reduction systems, a local microphone array (LMA) worn on the recipient (i.e., part of the device) is used to focus on a sound source (e.g., speaker) that is in a predefined direction, such as directly in front of recipient. While such a noise reduction system may be robust, it is also prone to poor performance in situations where the desired speaker is not in the predefined direction. Examples of such situations may be found in classroom environments or while a recipient is travelling in a motor vehicle. The integrated noise reduction techniques presented herein improve upon these existing noise reduction systems in several distinct ways: (i) by including the ability to focus on a target sound source (e.g., speaker) that is not in the predefined direction and, in certain arrangements, (ii) by including external microphones (XMs) that operate together with the LMA, resulting in further noise reduction as opposed to using only the LMA.

In certain embodiments presented herein, integrated noise reduction techniques will utilize two separate tuning parameters, one for controlling the sound received from the predefined direction, and the other for the sound received from an estimated direction where the target sound source may be located. In these embodiments, each of these directions can be defined using the LMA and the XMs. In order to define the predefined direction with the LMA and the XMs, a modified version of the improved method of estimation of a transfer function for the XM is used, where the input signals have to undergo a specific series of transformations.

Using one or several XMs along with the LMA can provide significant speech intelligibility improvement, for instance in the case where XMs may be quite close to the desired speaker, or even if it provides a relevant noise reference. Additionally, the integrated noise reduction techniques presented herein are flexible in that they encompass a wide range of noise reduction options according to the tuning of the system.

For ease of understanding, the following description is organized into several sections. In particular, section II describes a data model, which considers the general case of a local microphone array (LMA) in conjunction with one or several external microphones (XMs), which can be reduced to a single external microphone without compromising the equations provided herein. A transformed domain, as well as a pre-whitened-transformed domain is also introduced in order to simplify the flow of signal processing operations and realize distinct digital signal processing (DSP) block schemes.

In section III, an integrated minimum variance distortionless response (MVDR) beamformer is discussed as applied to a local microphone array. In particular, section III describes an integrated MVDR beamformer, which leverages the use of a priori assumptions and the use of estimated quantities. In section IV, an integrated MVDR beamformer as applied to a local microphone array together with one or more external microphones is described. Again, an integrated MVDR beamformer for application to a local microphone array together with one or more external microphones, which leverages the use of a priori assumptions and the use of estimated quantities is described.

II. Data Model

A. Unprocessed Signals

Consider a noise reduction system that consists of a local microphone array (LMA) of $M_a$ microphones and $M_e$ external microphones, providing a total of $M_a+M_e$ number of microphones. Also consider a scenario where there is only one desired/target sound source, such as a target speech source, in a noisy environment. Proceeding to formulate the problem in the short-time Fourier transform (STFT) domain, the received signal can be represented at one particular frequency, k, and one time frame, l as:

$$\begin{aligned} y(k, l) &= x(k, l) + n(k, l) && (1) \\ &= a(k, l)s(k, l) + n(k, l) && (2) \end{aligned}$$

where (dropping the dependency on k and l for brevity), $y=[y_a^T, y_e^T]^T$, $y_a=[y_{a,1}\ y_{a,2}\ \ldots\ y_{a,M_a}]^T$ are the local microphone signals, $y_e=[y_{e,1}\ y_{e,2}\ \ldots\ y_{e,M_e}]^T$ are the external microphone signals, x is the speech component consisting of $a=[a_a^T\ a_e^T]^T$, the acoustic transfer function (ATF) from the speech source to all $M_a+M_e$ microphones and s, the speech source signal. Finally, $n=[n_a^T\ n_e^T]^T$ represents the noise component, which consists of a combination of correlated and uncorrelated noises. Variables with the subscript "a" refer to the LMA signals and variables with the subscript "e" refer to the XM signals. The dependencies on k and l will be introduced herein, as needed, for mathematical derivations.

In general, the speech component (target sound), x, can be represented in terms of a relative transfer function (RTF) vector such that:

$$x=as=hs_1 \quad (3)$$

where $s_1=a_{a,1}s$, is the speech in a reference microphone of the LMA (w.l.o.g the first microphone is chosen as the reference microphone) and h is the RTF vector defined as:

$$\begin{aligned} h &= \left[1 \frac{a_{a,2}}{a_{a,1}} \ldots \frac{a_{a,M_a}}{a_{a,1}} \middle| \frac{a_{e,1}}{a_{a,1}} \ldots \frac{a_{e,M_e}}{a_{a,1}}\right]^T && (4) \\ &= \left[1 h_{a,2} \ldots h_{a,M_a} \middle| h_{e,1} h_{e,2} \ldots h_{e,M_e}\right]^T \\ &= \left[h_a^T \middle| h_e^T\right]^T \end{aligned}$$

consisting of an RTF vector corresponding to the LMA signals, $h_a$ and an RTF vector corresponding to the XM signals, $h_e$. With such a formulation, the noise reduction system will aim to produce an estimate for the speech component in the reference microphone, $s_1$.

The $(M_a+M_e)\times(M_a+M_e)$ speech-plus-noise, noise-only, and speech-only spatial correlation matrices are given respectively as:

$$R_{yy}=\mathbb{E}\{yy^H\} \quad (5)$$

$$R_{nn}=\mathbb{E}\{nn^H\} \quad (6)$$

$$R_{xx}=\mathbb{E}\{xx^H\} \quad (7)$$

where $\mathbb{E}\{.\}$ is the expectation operator and H is the Hermitian transpose. It is assumed that the speech components are uncorrelated with the noise components, and hence the speech-only correlation matrix can be found from the difference of the speech-plus-noise correlation matrix and the noise-only correlation matrix:

$$R_{xx}=R_{yy}-R_{nn} \quad (8)$$

The speech-plus-noise and noise-only correlation matrices are estimated from the received microphone signals during speech-plus-noise and noise-only periods, using a voice activity detector (VAD). The correlation matrices can also be calculated solely for the LMA signals respectively as $R_{y_ay_a}=\mathbb{E}\{y_ay_a^H\}$, $R_{n_an_a}{}^H=\mathbb{E}\{n_an_a^H\}$, and $R_{x_ax_a}=\mathbb{E}\{x_ax_a^H\}$ (which can be realized by the top left $(M_a\times M_a)$ block of the corresponding entire correlation matrices in (5)-(7)).

The estimate of the speech component in the reference microphone, $z_1$, is then obtained through the linear filtering of the microphone signals, such that:

$$\boxed{z_1 = w^H y} \tag{9}$$

Where $w=[w_a^T w_e^T]T$ is the complex-valued filter to be designed.

B. Transformed Domain

As will be described later, working with the signals in a transformed domain will result in convenient relations to be made and an overall simplification of the flow of signal processing operations. The transformation will be based on an a priori assumed RTF vector for the LMA signals, $\tilde{h}_a$ (which may or may not be equal to $h_a$). Firstly, an $M_a\times(M_a-1)$ unitary blocking matrix $B_a$ for $\tilde{h}_a$ and an $M_a\times 1$ vector $b_a$ are defined such that:

$$B_a^H \tilde{h}_a = 0;\ \ b_a = \frac{\tilde{h}_a}{\|\tilde{h}_a\|} \tag{10}$$

where $B_a^H B_a = I_{(M_a-1)}$ and in general $I_\vartheta$ denotes the $\vartheta\times\vartheta$ identity matric, and $b_a$ can be interpreted as a scaled matched filter. W.l.o.g, $b_a$ will simply be referred to as a matched filter in the following derivations. Using $B_a$ and $b_a$, an $(M_a+M_e)\times(M_a+M_e)$ unitary transformation matrix, T, can be subsequently defined:

$$T = \left[\begin{array}{c|c} T_a & 0 \\ \hline 0 & I_{M_e} \end{array}\right] = \left[\begin{array}{c|c} [B_a\ \ b_a] & 0 \\ \hline 0 & I_{M_e} \end{array}\right] \tag{11}$$

where $T_a=[B_a\ \ b_a]$, $T_a^H\ T_a=I_{M_a}$, and hence indeed $T^H T=I_{(M_a+M_e)}$. Consequently, the transformed input signals, y, become:

$$T^H y = \begin{bmatrix} T_a^H y_a \\ y_e \end{bmatrix} = \begin{bmatrix} B_a^H y_a \\ b_a^H y_a \\ y_e \end{bmatrix} \tag{12}$$

The transformed noise signals can also be similarly defined:

$$T^H n = \begin{bmatrix} T_a^H n_a \\ n_e \end{bmatrix} = \begin{bmatrix} B_a^H n_a \\ b_a^H n_a \\ n_e \end{bmatrix} \tag{13}$$

It should be understood that this transformation domain is the LMA signals that pass through a blocking matrix and a matched filter, as in the first stage of a generalized sidelobe canceller (GSC) (i.e., the adaptive implementation of an MVDR beamformer), along with the XM signals.

C. Pre-Whitened-Transformed Domain

A spatial pre-whitening operation can be defined from the noise-only correlation matrix in the previously described transform domain by using the Cholesky decomposition:

$$\mathbb{E}\{(T^H n)(T^H n)^H\}=LL^H \tag{14}$$

where L is an $(M_a+M_e)\times(M_a+M_e)$ lower triangular matrix. In block form, L can be realized as:

$$L = \left[\begin{array}{c|c} \underset{(M_a\times M_a)}{L_a} & \underset{(M_a\times M_e)}{0} \\ \hline \underset{(M_e\times M_a)}{L_c} & \underset{(M_e\times M_e)}{L_x} \end{array}\right]$$

Where $L_a$ and $L_x$ are lower triangular matrices. It should be noted that $L_a$ corresponds to the LMA signals and are from a Cholesky decomposition of the noise correlation matrix from the LMA signals in the transformed domain, hence:

$$\mathbb{E}\{(T_a^H n_a)(T_a^H n_a)^H\}=L_a L_a^H \tag{16}$$

A signal vector in the transformed domain can be consequently pre-whitened by pre-multiplying it with $L^{-1}$. Such signal quantities will be denoted with the underbar $\underline{(.)}$ notation. Hence, the signal y in this so-called pre-whitened-transformed domain is given by:

$$\boxed{\underline{y} = \begin{bmatrix} \underline{y}_a \\ \underline{y}_e \end{bmatrix} = L^{-1} T^H y} \tag{17}$$

and similarly for n:

$$\underline{n} == \begin{bmatrix} \underline{n}_a \\ \underline{n}_e \end{bmatrix} = L^{-1} T^H n \tag{18}$$

The respective correlation matrices are also given by:

$$\underline{R}_{yy} = \mathbb{E}\{\underline{y}\underline{y}^H\}$$

$$\underline{R}_{nn} = \mathbb{E}\{\underline{n}\underline{n}^H\} = I_{(M_a+M_e)}$$

$$\underline{R}_{xx} = \underline{R}_{yy} - \underline{R}_{nn}$$

The spatial correlation matrices for the speech and noise and the noise-only, and the speech-only can also be calculated solely for the LMA signals respectively as $\underline{R}_{y_a y_a} = \mathbb{E}\{\underline{y}_a \underline{y}_a^H\}$, $\underline{R}_{n_a n_a} = I_{M_a}$, and $\underline{R}_{x_a x_a} = \underline{R}_{y_a y_a} - \underline{R}_{n_a n_a}\&_{anti}$.

D. Summary of Symbols and Realization

FIG. 1 is a block diagram illustrating the flow of the previously described transformations on the unprocessed signals. Transformation block 102 is a processing block that represents the first transformation of section II-B, in which the LMA signals pass through a blocking matrix 104 and a matched filter 106, analogous to the first stage of a GSC. The XM signals are unaltered. The pre-whitening block 108 is a processing block that represents the pre-whitening operation of section II-C, yielding signals 109 in the pre-whitened-transformed domain. The noise reduction filters that will be developed below will then be directly applied to these pre-whitened-transformed signals (i.e., the output of pre-whitening block 108) in order to yield the desired speech estimate.

The following is also a summary of how the symbolic notation should be interpreted throughout this document:

- $(.)_a$ refer to quantities associated with the LMA signals, e.g., $y_a$.
- $(.)_e$ refer to quantities associated with the XM signals, e.g., $y_e$.
- $\tilde{(.)}$ refer to a priori assumed quantities, e.g., $\tilde{h}$.
- $\hat{(.)}$ refer to estimated quantities, e.g., $\hat{h}$.
- $\underline{(.)}$ refer to quantities in the pre-whitened-transformed domain, e.g., $\underline{y}_a$.

III. MVDR Using a LMA ($MVDR_a$)

The MVDR beamformer minimizes the total noise power (minimum variance), while preserving the received signal in a particular direction (distortionless response). This direction is specified by defining the appropriate RTF vector for the MVDR beamformer. Considering only the LMA, the MVDR problem can be formulated as follows (which will be referred to as the $MVDR_a$):

$$\min_{w_a} \; w_a^H R_{n_a n_a} w_a$$
$$\text{s.t.} \quad w_a^H h_a = 1$$

where $h_a$ is the RTF vector from (4), which in practice is unknown and hence will be replaced either by a priori assumptions or estimated from the speech-plus-noise correlation matrices. The optimal noise reduction filter is then given by:

$$w_a = \frac{R_{n_a n_a}^{-1} h_a}{h_a^H R_{n_a n_a}^{-1} h_a} \tag{23}$$

Finally, the speech estimate, $z_{a,1}$, from this $MVDR_a$ beamformer is obtained through the linear filtering of the microphone signals with the complex-valued filter $w_a$:

$$z_{a,1} = w_a^H y_a \tag{24}$$

In sections III-A and III-B, strategies for designing an $MVDR_a$ beamformer using an RTF vector based either on a priori assumptions or estimated from the speech-plus-noise correlation matrices are discussed. Section III-C illustrates an integrated beamformer that integrates the use of priori assumptions with estimates.

A. Using an a Priori Assumed RTF Vector

The $MVDR_a$ problem can be formulated as in (22), except with using an a priori assumed RFT vector, $\tilde{h}_a=[1\ \tilde{h}_{a,2}\ \ldots\ \tilde{h}_{a,M}]^T$ instead of $h_a$. This $\tilde{h}_a$ can be based on a priori assumptions regarding microphone characteristics, position, speaker location and room acoustics (e.g., no reverberation). Similar to (23), the optimal noise reduction filter is then given by:

$$\tilde{w}_a = \frac{R_{n_a n_a}^{-1} \tilde{h}_a}{\tilde{h}_a^H R_{n_a n_a}^{-1} h_a} \tag{25}$$

The speech estimate, $\tilde{z}_{a,1}$, from this $MVDR_a$ with an a priori assumed RTF vector is then:

$$\tilde{z}_{a,1} = \tilde{w}_a^H y_a \tag{26}$$

This conventional formulation of the $MVDR_a$ can also be equivalently posed in the pre-whitened-transformed domain (section II-C). As derived in Appendix A, the speech estimate in this domain is given by:

$$\boxed{\tilde{z}_{a,1} = \frac{l_{M_a}}{\|\tilde{h}_a\|} \underline{y}_{a,M_a}} \tag{27}$$

Where $l_{M_a}$ is the bottom-right element in $L_a$, and $\underline{y}_{a,M_a}$ is the last component of the pre-whitened-transformed signals, $\underline{y}_a$. In other words, the speech estimate for an $MVDR_a$ filter that uses an a priori assumed RTF vector results in a simple scaling of the last component of the pre-whitened-transformed signals. With such a formulation in this domain, this beamforming algorithm can be realized in a distinct set of signal processing blocks as illustrated in FIG. 2.

Figure 2:
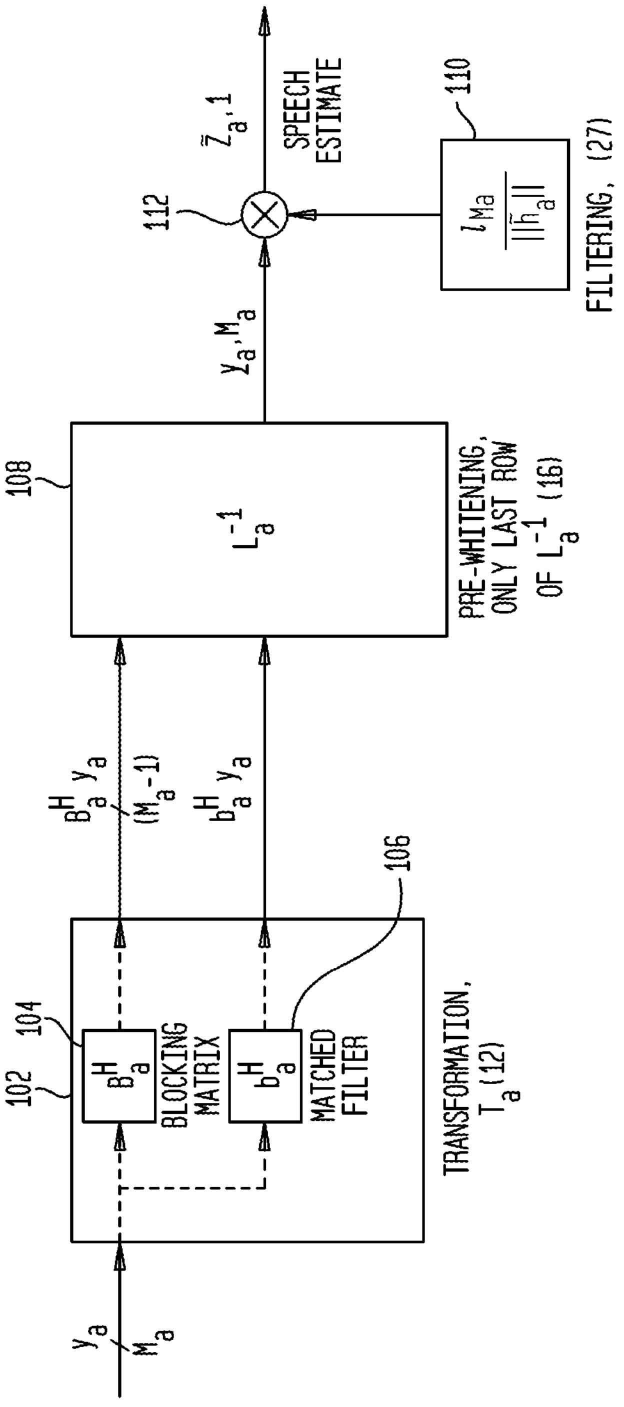
FIG. 2 is a functional block diagram illustrating the generation of an a priori estimate of at least one target sound in sound signals received at a local microphone array.

More specifically, FIG. 2 illustrates transformation block 102 and pre-whitening block 108, as described above with reference to FIG. 1. However, in the example of FIG. 2, in-whitening block 108, the only the last row of $L_a^{-1}$ is used, (16), thus the resulting in the signal $\underline{y}_{a,M_a}$. Also shown is an a priori filter 110, which produces $$\frac{l_{M_a}}{\|\tilde{h}_a\|}$$

and processing block 112 which applies $$\frac{l_{M_a}}{\|\tilde{h}_a\|}$$

to $\underline{y}_{a,M_a}$. The application of $$\frac{l_{M_a}}{\|\tilde{h}_a\|}$$

to $\underline{y}_{a,M_a}$ produces an a priori speech estimate $\tilde{z}_{a,1}$. The apriori speech estimate, $\tilde{z}_{a,1}$, is an estimate of the target sound (e.g., speech) in the received sound signals, based solely on an a priori RTF vector. The RTF vector is generated uses assumptions regarding, for example, location of the source of the target sound, characteristics of the microphones (e.g., microphone calibration in regards to gains, phases, etc.), reverberant characteristics of the target sound source, etc. The a priori speech estimate $\tilde{z}_{a,1}$, is an example of an a priori estimate of at least one target sound in the received sound signals.

B. Using an Estimated RTF Vector

The RTF vector may also be estimated without reliance on any a priori assumptions and can be used to enhance the speech regardless of the speech source location. One such method is a method of covariance whitening or equivalently that which involves a Generalized Eigenvalue Decomposition (GEVD).

In such examples, a rank-1 matrix approximation problem can be formulated to estimate the RTF vector for a given set of LMA signals such that:

$$\min_{\hat{R}_{x,r1}} \|(R_{y_a y_a} - R_{n_a n_a}) - \hat{R}_{xa,r1}\|_F^2 \tag{28}$$

where $\|.\|_F$ is the Frobenius norm, and $\hat{R}_{xa,r1}$ is a rank-1 approximation to $(R_{y_a y_a} - R_{n_a n_a})$ defined as:

$$\hat{R}_{xa,r1} = \hat{\Phi}_{xa,r1} \hat{h}_a \hat{h}_a^H \tag{29}$$

Where $\hat{h}_a=[\hat{h}_{a,2}\ \ldots\ \hat{h}_{a,M_a}]^T$ the estimated RTF vector.

As opposed to using the raw signal correlation matrices, the estimation problem of (28) can be equivalently formulated in the pre-whitened-transformed domain. In appendix B, it is shown that the estimated RTF vector is then:

$$\hat{h}_a = \frac{T_a L_a p_{max}}{\eta_\rho} \tag{30}$$

where $p_{max}$ is a generalized eigenvector of the matrix pencil $\{\underline{R}_{y_a y_a}, \underline{R}_{n_a n_a}\}$, which as a result of the pre-whitening ($\underline{R}_{n_a n_a}=I_{M_a}$) corresponds to the principal (first in this case) eigenvector of $\underline{R}_{y_a y_a}$, the scaling $\eta_\rho=e^T_{a1}T_a L_a P_{max}$ and the M×1 vector $e_{a1}=[1\ 0\ \ldots\ 0]^T$. The resulting $MVDR_a$ using this estimated RTF vector is now given by:

$$\hat{w}_a = \frac{R_{n_a n_a}^{-1}\hat{h}_a}{\hat{h}_a^H R_{n_a n_a}^{-1}\hat{h}_a} \tag{31}$$

As was done in section III-A, this filter based on estimated quantities can also be reformulated in the transformed, pre-whitened-transformed domain. Leaving the derivations once again to Appendix B, the corresponding speech estimate using the estimated RTF vector is:

$$\hat{z}_{a,1} = \eta_\rho p_{max}^H \underbrace{L_a^{-1} T_a^H y_a}_{\underline{y}_a} \tag{32}$$

$$\boxed{\hat{z}_{a,1} = \eta_\rho p_{max}^H \underline{y}_a}$$

where $\eta_\rho{}^*p_{max}$ can be considered as the pre-whitened-transformed filter (where $\{.\}^*$ is the complex conjugate), which can be used to directly filter the pre-whitened, transformed signals, $\underline{y}_a$. These operations can also be realized in a distinct set of signal processing blocks, as illustrated in FIG. 3.

Figure 3:
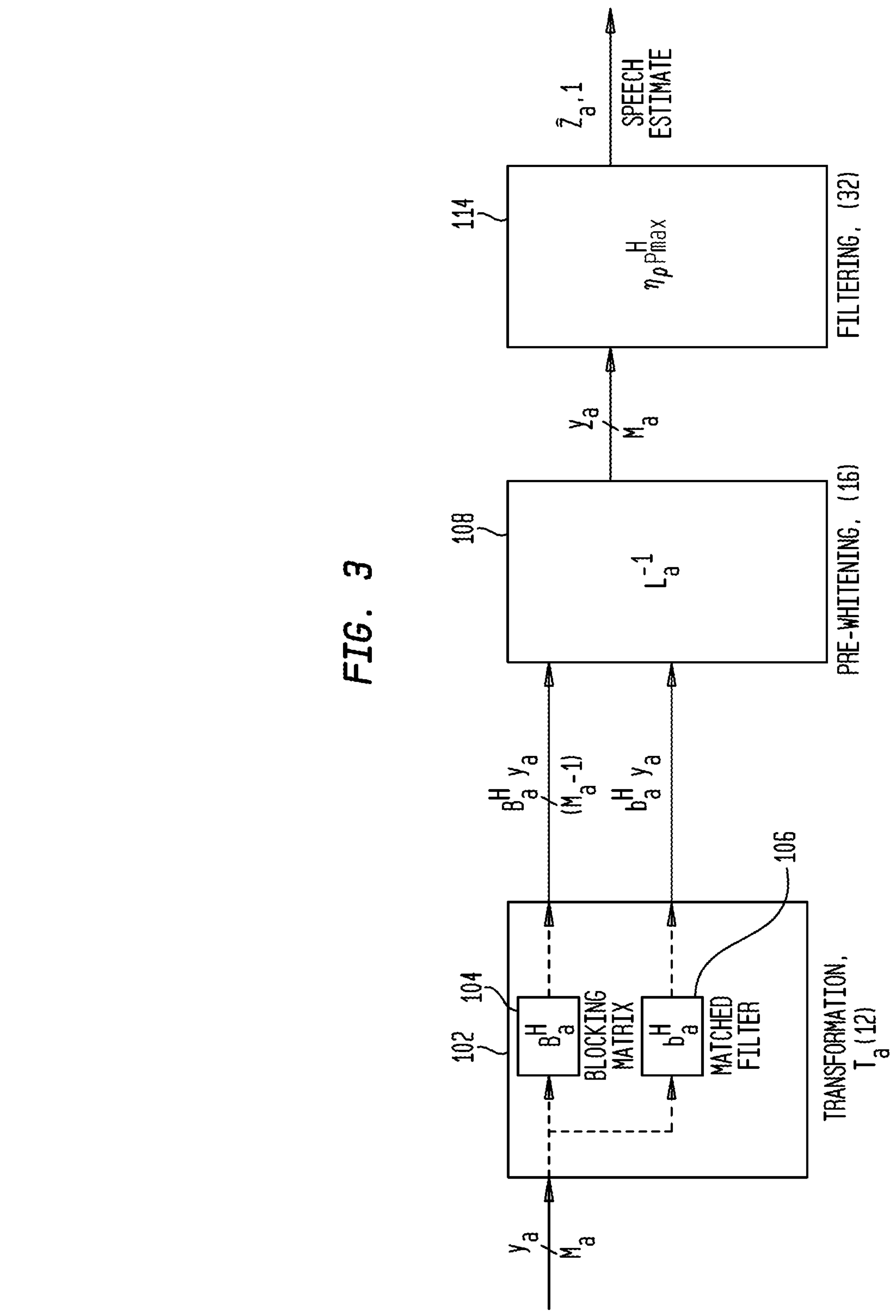
FIG. 3 is a functional block diagram illustrating the generation of a direct estimate of at least one target sound in sound signals received at a local microphone array.

More specifically, FIG. 3 illustrates transformation block 102 and pre-whitening block 108, as described above with reference to FIG. 1, which produce pre-whitened-transformed signals. Also shown is block 114, which filters the pre-whitened-transformed signals in accordance with $\eta_\rho{}^*p_{max}$ (i.e., 114 represents the hermitian transposed pre-whitened-transformed filter). The output of the pre-whitened-transformed filter 114 is a direct speech estimate, $\hat{z}_{a,1}$ (i.e., (32), above).

The direct speech estimate, $\hat{z}_{a,1}$, is an estimate of the target sound (e.g., speech) in the received sound signals, based solely on an estimated RTF vector. The estimated RTF vector is generated using real-time estimates of, for example, the location of the source of the target sound, reverberant characteristics of the target sound source, etc. The direct speech estimate, $\hat{z}_{a,1}$, is an example of a direct estimate of at least one target sound in the received sound signals.

C. Integrated $MVDR_a$ Beamformer

Described above are two general MVDR approaches, one that imposes a priori assumptions for the definition of the RTF vector in the MVDR filter, and another that involves an estimation of this RTF vector. In conventional arrangements, a choice typically has to be made between one of these approaches with an acceptance of their inevitable drawbacks. However, in accordance the integrated noise reduction techniques presented herein, both approaches are integrated into one global filter, referred to herein as an "integrated $MVDR_a$ beamformer" that exploits the benefits of each approach.

In general, the integrated $MVDR_a$ beamformer provides for integrated tunings which allow different "weights" to be applied to each of (1) an a priori assumed representation of target sound within received sound signals (e.g., an a priori estimate of at least one target sound in the received sound signals), and (2) an estimated representation of the target sound within received sound signals (e.g., a direct estimate of at least one target sound in the received sound signal). The weights applied to each of the a priori assumed representation of the target sound and the estimated representation of the target sound are selected based on "confidence measures" associated with each of the a priori assumed representation of the target sound and the estimated representation of the target sound, respectively.

For instance, with the integrated $MVDR_a$ beamformer, if the speech source moves outside of the direction defined by an a priori assumed RTF vector, more weight can be given to an estimated RTF vector to account for the loss in performance that would otherwise result from using the a priori assumed RTF vector alone. On the other hand, if the estimated RTF vector becomes unreliable, less weight can be given thereto and the system can revert to using the a priori assumed RTF vector, which may have an improved performance if the speech source is indeed in the direction defined by the a priori assumed RTF vector. Combination/mixing of the a priori assumed RTF vector and the estimated RTF vector is also possible. That is, the tuning parameters can achieve multiple beamformers, i.e. one that relies on a priori assumptions alone, one that relies on estimated quantities alone, or the mixture of both.

One particular tuning of interest may be to place a large weight on an a priori assumed RTF vector, but weighting an estimated RTF vector only when appropriate. This represents a mechanism for reverting to an a priori assumed RTF vector when the estimated RTF vector was unreliable.

In the following, the integrated $MVDR_a$ beamformer is briefly derived. If the case is considered where $\hat{h}_a$ is defined according to a priori assumptions and $h_a$ is estimated from (86), an integrated $MVDR_a$ cost function can be given as:

$$\min_{w_a}\ w_a^H R_{n_a n_a} w_a + \alpha\left|w_a^H \tilde{h}_a - 1\right|^2 + \beta\left|w_a^H \hat{h}_a - 1\right|^2 \tag{33}$$

where $\alpha\in[0,\infty]$ and $\beta\in[0,\infty]$ are tuning parameters that control how much of the respective RTF vectors (i.e., the a priori assumed RTF vector and the estimated RTF vector) are weighted. This cost function is the combination of that of an $MVDR_a$ (as in (22)) defined by $\tilde{h}_a$ and another defined by $\hat{h}_a$, except that the constraints have been softened by α and β.

The solution to (33) is given by:

$$w_{a,int}=f_{pr}(\alpha,\beta)\tilde{w}_a+f_{est}(\alpha,\beta)\hat{w}_a \tag{34}$$

where $\tilde{w}_a$ and $\hat{w}_a$ are defined in (25) and (31) respectively.

$$f_{pr}(\alpha,\beta) = \left[\frac{\alpha k_{dd}[1+\beta(k_{pp}-k_{dp})]}{\alpha k_{dd}+\beta k_{pp}+\alpha\beta(k_{pp}k_{dd}-k_{dp}k_{pd})+1}\right] \tag{35}$$

$$f_{est}(\alpha,\beta) = \left[\frac{\beta k_{pp}[1+\alpha(k_{dd}-k_{pd})]}{\alpha k_{dd}+\beta k_{pp}+\alpha\beta(k_{pp}k_{dd}-k_{dp}k_{pd})+1}\right] \tag{36}$$

with the constants:

$$k_{dd} = \tilde{h}_a^H R_{n_a n_a}^{-1}\tilde{h}_a; \quad k_{pp} = \tilde{h}_a^H R_{n_a n_a}^{-1}\hat{h}_a; \quad k_{dp} = \tilde{h}_a^H R_{n_a n_a}^{-1}\hat{h}_a; \quad k_{pd} = \tilde{h}_a^H R_{n_a n_a}^{-1}\tilde{h}_a \tag{37}$$

This integrated MVDR beamformer reveals that the $\text{MVDR}_a$ beamformer based on α priori assumptions from (25) and that which is based on estimated quantities from (31) can be combined according to the functions $f_{pr}(\alpha,\beta)$ and $f_{est}(\alpha,\beta)$ respectively.

As in the previous sections, this integrated beamformer can also be expressed in the pre-whitened-transformed domain as follows:

$$w_{a,int} = f_{pr}(\alpha, \beta) T_a L_a^{-H} \frac{l_{M_a}}{\|\tilde{h}_a\|} + f_{est}(\alpha, \beta) T_a L_a^{-H} \eta_p p_{max} \tag{38}$$

and with the constants equivalently, but alternatively defined as:

$$\begin{aligned} k_{dd} &= \underline{\tilde{h}}_a^H \underline{\tilde{h}}_a; \\ k_{pp} &= \underline{\tilde{h}}_a^H \underline{\hat{h}}_a; \\ k_{dp} &= \tilde{h}_a^H \hat{h}_a; \\ k_{pd} &= \underline{\tilde{h}}_a^H \underline{\tilde{h}}_a \end{aligned} \tag{39}$$

where $\underline{\tilde{h}}_a$ and $\underline{\hat{h}}_a$ are given in (79) and (88) respectively.

The resulting speech estimate from this integrated beamformer is then given by:

$$\hat{z}_{a,int} = f_{pr}^*(\alpha, \beta) \frac{l_{M_a}}{\|\tilde{h}_a\|} + \underline{y}_{a,M_a} + f_{est}^*(\alpha, \beta) \eta_p p_{max}^H \underline{y}_a \tag{40}$$

$$\boxed{\hat{z}_{a,int} = f_{pr}^*(\alpha, \beta) \tilde{z}_{a,1} + f_{est}^*(\alpha, \beta) \tilde{z}_{a,1}}$$

The benefit of this pre-whitened-transformed domain is apparent where, with such an integrated beamformer of (38), $\underline{\tilde{w}}_{a,M_a}$ and $\underline{\hat{w}}_a$ can be directly used to filter the pre-whitened-transformed signals, and then combined with the appropriate weightings as defined by the functions $f_{pr}(\alpha,\beta)$ and $f_{est}(\alpha,\beta)$, to yield the respective speech estimate. These functions $f_{pr}(\alpha,\beta)$ and $f_{est}(\alpha,\beta)$ can be tuned such as to emphasize the result from an MVDR beamformer that uses either an a priori assumed RTF vector or an estimated RTF vector. This results in a digital signal scheme as depicted in FIG. 4.

Figure 4:
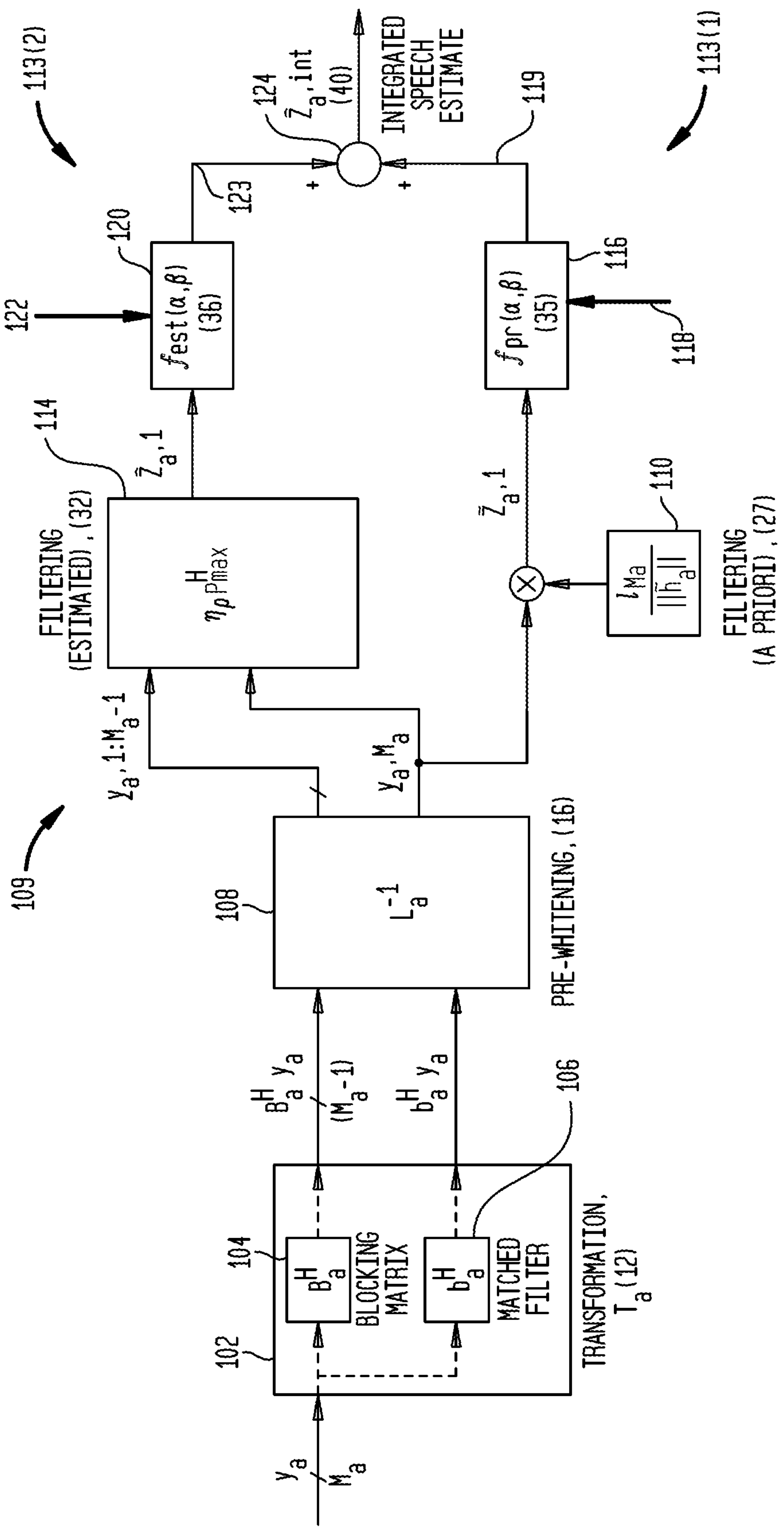
FIG. 4 is a functional block diagram illustrating the generation of an integrated estimate of at least one target sound in sound signals received at a local microphone array.

More specifically, FIG. 4 is a block diagram of an integrated $\text{MVDR}_a$ beamformer 125 in accordance with embodiments presented herein. The integrated $\text{MVDR}_a$ beamformer 125 comprises a plurality of processing blocks, which include transformation block 102 and pre-whitening block 108. As described above with reference to FIG. 1 transformation block 102 and pre-whitening block 108 produce signals 109 in the pre-whitened-transformed domain (pre-whitened-transformed signals).

Also shown in FIG. 4 are two processing branches 113(1) and 113(2) that each operate based on all or part of the pre-whitened-transformed signals 109. The first processing branch 113(1) includes an a priori filter 110, which produces $$\frac{l_{M_a}}{\|\tilde{h}_a\|}$$

and a processing block 112 which applies $$\frac{l_{M_a}}{\|\tilde{h}_a\|}$$

to $\underline{y}_{a,M_a}$. The application of $$\frac{l_{M_a}}{\|\tilde{h}_a\|}$$

to $\underline{y}_{a,M_a}$ generates the a priori speech estimate $\tilde{z}_{a,1}$, that is generated based solely on an a priori RTF vector (i.e., an estimate of the speech in the received sound signals, based solely on a priori assumptions such as microphone characteristics, source location, and reverberant characteristics of the target sound (e.g., speech) source. In other words, application of $$\frac{l_{M_a}}{\|\tilde{h}_a\|}$$

to $\underline{y}_{a,M_a}$ generates an a priori estimate of at least one target sound in the received sound signals.

The first branch 113(1) also comprises a first weighting block 116. The first weighting block 116 is configured to weight the speech estimate, $\tilde{z}_{a,1}$, in accordance with the complex conjugate of the function $f_{pr}(\alpha,\beta)$ (i.e., (35) and (40), above). More generally, the first weighting block 116 is configured to weight the speech estimate, $\tilde{z}_{a,1}$, in accordance with a cost function controlled by a plurality of tuning parameters (e.g., $(\alpha,\beta)$). The tuning parameters of the cost function (e.g., $f_{pr}(\alpha,\beta)$), are set based on one or more confidence measures 118 generated for the speech estimate, $\tilde{z}_{a,1}$. The one or more confidence measures 118 represent an assessment or estimate of the accuracy/reliability of the a priori speech estimate, $\tilde{z}_{a,1}$, and the hence the accuracy of the a priori RTF vector used to generate the speech estimate, $\tilde{z}_{a,1}$. The first weighting block 116 generates a weighted a priori speech estimate, shown in FIG. 5 by arrow 119.

The second branch 113(2) includes a pre-whitened-transformed filter 114, which filters the pre-whitened-transformed signals in accordance with (32). The output of the pre-whitened-transformed filter 114 is a direct speech estimate, $\hat{z}_{a,1}$, that is generated based solely on an estimated RTF vector (i.e., an estimate of the speech in the received sound signals, which takes into consideration microphone characteristics and may contain information such as the location and some reverberant characteristics of the speech source). In other words, the direct speech estimate $\hat{z}_{a,1}$, is an example of a direct estimate of at least one target sound in the received sound signals.

The second branch 113(2) also comprises a second weighting block 120. The second weighting block 120 is configured to weight the speech estimate, $z_{a,1}$, in accordance with complex conjugate of the function $f_{est}(\alpha,\beta)$ (i.e., (36) and (40), above). More generally, the second weighting block 120 is configured to weight the direct speech estimate, $\hat{z}_{a,1}$, in accordance with a cost function controlled by a plurality of tuning parameters (e.g., $(\alpha,\beta)$). The tuning parameters of the cost function (e.g., $f_{est}(\alpha,\beta)$ are set based on one or more confidence measures 122 generated for the speech estimate, $\hat{z}_{a,1}$. The one or more confidence measures

122 represent an assessment or estimate of the accuracy/reliability of the speech estimate, $\hat{z}_{a,1}$, and the hence the accuracy of the estimated RTF vector used to generate the speech estimate, $\hat{z}_{a,1}$. The second weighting block 120 generates a weighted direct speech estimate, shown in FIG. 5 by arrow 123.

FIG. 4 also illustrates processing block 124 which integrates/combines the weighted a priori speech estimate 119 and the weighted direct speech estimate 123. The combination of the weighted a priori speech estimate 119 and the weighted direct speech estimate 123 is referred to as an integrated speech estimate, $\hat{z}_{a,int}$ (i.e., (40), above). The integrated speech estimate may be used for subsequent processing in the device (e.g., auditory prosthesis).

IV. MVDR with a LMA and XM Signals ($MVDR_{a,e}$)

Section III, above, illustrates an embodiment in which the integrated beamformer operates based on local microphone array (LMA) signals. As noted above, LMA signals are generated by a local microphone array (LMA) that are part of the device that performs the integrated noise reduction techniques. In the case of auditory prostheses, such as cochlear implants, the LMA is worn on the recipient.

As described further below, the integrated noise reduction techniques described herein can be extended to include external microphone (XM) signals, in addition to the LMA signals. These XM signals are generated by one or more external microphones (XMs) that are not part of the device that performs the integrated noise reduction techniques, but that can nevertheless communicate with the device (e.g., via a wireless connection). The external microphones may be any type of microphone (e.g., microphones in a wireless microphone device, microphones in a separate computing device (e.g., phone laptop, tablet, etc.), microphones in another auditory prosthesis, microphones in a conference phone system, microphones in hands-free system, etc.) for which the location of the microphone(s) is unknown relative to the microphones of the LMA. In other words, as used herein, an external microphone may be any microphone that has an unknown location, which may change over time, with respect to the local microphone array.

Extending the techniques herein to the use of LMA signals and XM signals, the integrated beamformer is referred to as the $MVDR_{a,e}$:

$$\min_{w} \; w^H R_{nn} w \qquad \text{s.t.} \;\; W^h h = 1$$

where h is the RTF vector ((4), above) that includes $M_a$ components corresponding to the LMA, $h_a$, and $M_e$ components corresponding to the XMs, $h_e$, and $R_{nn}$ is the $(M_a+M_e)\times(M_a+M_e)$ noise correlation matrix:

$$R_{nn} = \left[\begin{array}{c|c} \underset{(M_a\times M_a)}{R_{n_a n_a}} & \underset{(M_a\times M_e)}{R_{n_a n_e}} \\ \hline \underset{(M_e\times M_a)}{R^H_{n_a n_e}} & \underset{(M_e\times M_e)}{R_{n_e n_e}} \end{array}\right] \tag{42}$$

where the upper left block is the noise correlation matrix from the LMA signals, $R_{n_a n_e}$, is the noise cross-correlation between the LMA signals and the XM signals and $R_{n_e n_e}$ is the noise correlation of the XM signals. Similar to (23), the solution to (41) is given by:

$$w = \frac{R_{nn}^{-1} h}{h^H R_{nn}^{-1} h} \tag{43}$$

with the speech estimate, $z=w^H y$. Since, as noted above, the XMs have an unknown location, which may change over time, with respect to the local microphone array, generally no a priori assumptions can be made about the location of the XMs. Consequently, there are two potential approaches that can be taken in order to find h, namely: (i) only the missing component of the RTF vector corresponding to that of the XM signals needs to be estimated, while the a priori assumed RTF vector for the LMA signals is preserved; or (ii) the entire RTF vector is estimated for the LMA signals and the XM signals. In sections, IV-A and IV-B strategies for both approaches are briefly described.

A. Using a Partial a Priori Assumed RTF Vector and Partial Estimated RTF Vector

As previously mentioned, one option for the definition of h for the $MVDR_{a,e}$ is such that the a priori RTF vector for the LMA signals, $h_a$, is preserved and only the RTF vector for the XM signals is estimated. Such an RTF will therefore be defined as follows:

$$\tilde{h} = \left[\tilde{h}_a^T \mid \hat{h}_e^T\right]^T \tag{44}$$

It should be noted that although $\tilde{h}$ partially contains an estimated RTF vector, this is done with respect to the a priori assumptions set by $\tilde{h}_a$, and hence the notation for h is kept to be that of an a priori RTF vector (this is further elaborated upon in section IV-E). A method to compute $\hat{h}_e$ in the case of one XM using the cross-correlation between the external microphone and a speech reference provided by (26) using a GEVD is outlined below As in (28) a rank-1 matrix approximation problem can be formulated to estimate an entire RTF vector for a given set of microphone signals such that:

$$\min_{\tilde{R}_{x,r1}} \|(R_{yy} - R_{nn}) - R_{x,r1}\|_F^2 \tag{45}$$

where $\tilde{R}_{x,r1}$ is a rank-1 approximation to $R_{xx}$ (recall (8)). The a priori assumed RTF vector for the LMA signals can also be included for the definition of $\tilde{R}_{x,r1}$ and hence is given by:

$$\tilde{R}_{x,r1} = \hat{\Phi}_{x,r1}\begin{bmatrix}\tilde{h}_a \\ \hat{h}_e\end{bmatrix}\begin{bmatrix}\tilde{h}_a^H \; \hat{h}_e^H\end{bmatrix} \tag{46}$$

As opposed to using the raw signal correlation matrices, the estimation problem of (45) can be equivalently formulated in the pre-whitened-transformed domain. In Appendix C, it is shown that the estimated RTF vector could be found from a GEVD on the matrix pencil $\{J^T \underline{R}_{yy} J, J^T \underline{R}_{nn_\lambda} J\}$, where the selection matrix, $J=[0_{M_e+1\times(M_a-1)} | I_{M_e+1}]^T$. As a result of the pre-whitening ($\underline{R}_{nn}=I_{M_a+M_e}$), this GEVD can consequently be computed from the EVD of $J^T \underline{R}_{yy} J$, which is a lower order correlation matrix, of dimensions $(M_e+1)\times(M_e+1)$ that could be constructed from the last $(M_e+1)$ elements of the pre-whitened-transformed signals, namely that in relation to the last element of the LMA—$\underline{y}_{a,M_a}$, and those in relation to the XM signals—$\underline{y}_e$. The resulting RTF vector for the XM signals is then defined from the corresponding principal (first in this case) eigenvector, $v_{max}$:

$$\tilde{h}_e = \frac{\|\tilde{h}_a\|}{l_{M_a} v_1} J_e^T TL \;\; J v_{max} \tag{47}$$

where the selection matrix, $J_e=[0_{(M_e \times M_a)} | I_{M_e}]^T$.

Finally, this estimate is then used to compute the corresponding $MVDR_{a,e}$ filter with an a priori assumed RTF vector and a partially estimated RTF vector as:

$$\tilde{w} = \frac{R_{nn}^{-1}\tilde{h}}{\tilde{h}^H R_{nn}^{-1}\tilde{h}} \tag{48}$$

where $\tilde{h}$ as defined in (53) can be equivalently represented as:

$$\tilde{h} = \frac{\|\tilde{h}_a\|}{l_{M_a} v_1} TL \;\; J v_{max}$$

As was done in section III, this filter can also be reformulated in the pre-whitened-transformed domain. Leaving the derivations once again to Appendix C, the corresponding speech estimate was then found to be:

$$\boxed{\tilde{z}_1 = \frac{l_{M_a} v_1}{\|\tilde{h}_a\|} v_{max}^H \begin{bmatrix} \underline{y}_{a,M_a} \\ \underline{y}_e \end{bmatrix}} \tag{50}$$

where $$\frac{l_{M_a} v_1^*}{\|\tilde{h}_a\|} v_{max}$$

can be considered as a pre-whitened-transformed filter, which can be used to directly filter the last $(M_e+1)$ elements of the pre-whitened-transformed signals, i.e. $\underline{y}_{a,M_a}$ and $\underline{y}_e$.

Figure 5:
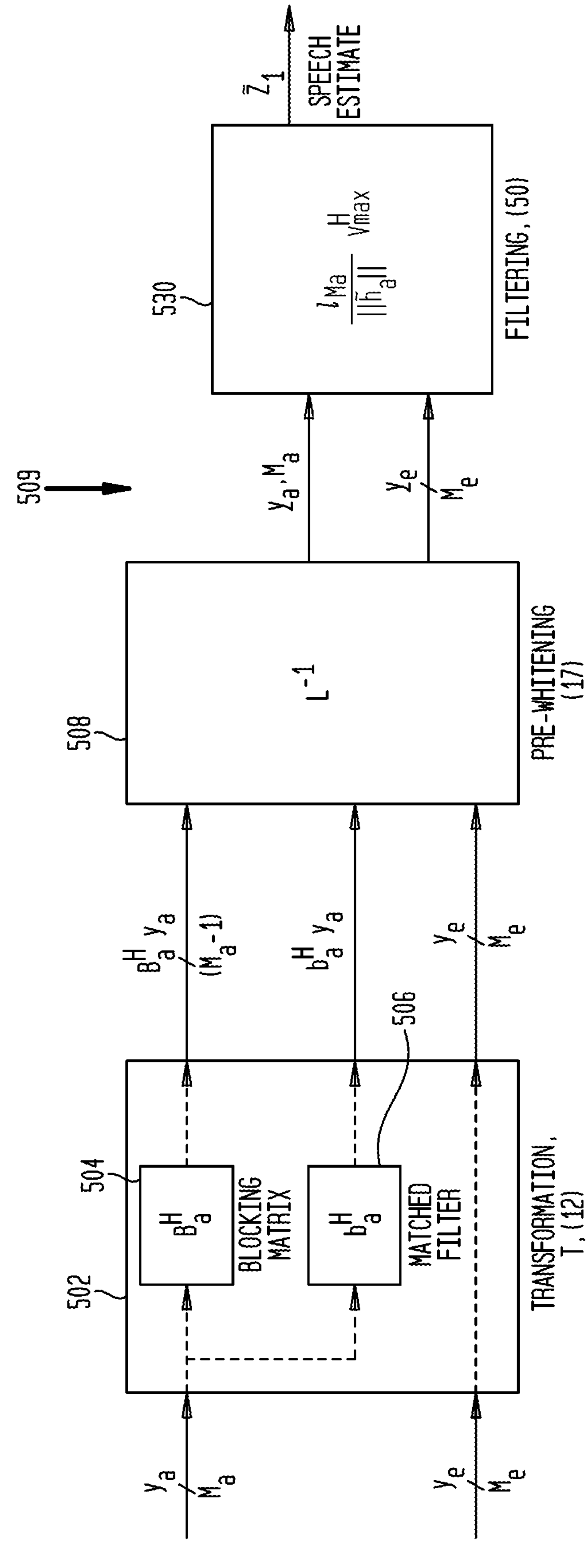
FIG. 5 is a functional block diagram illustrating the generation of an a priori estimate of at least one target sound in sound signals received at a local microphone array and at least one external microphone.

More specifically, FIG. 5 is a block diagram illustrating a transformation block 502 representing the first transformation of section II-B, in which the LMA signals pass through a blocking matrix 504 and a matched filter 506, analogous to the first stage of a GSC. The XM signals are unaltered. The pre-whitening block 508 represents the pre-whitening operation. The output of the pre-whitening block 508 is signals in the pre-whitened-transformed domain, referred to as pre-whitened-transformed signals 509.

Also shown in FIG. 5 is filter 530 (i.e., (50), above), which uses the whitened-transformed signals 509 to generate an a priori speech estimate, $\tilde{z}_1$. As such, the a priori speech estimate, $\tilde{z}_1$, is a speech estimate using a partial a priori assumed RTF vector and partial estimated RTF vector (i.e., using a priori assumptions for the definition of the RTF vector for the LMA signals, while estimating only the RTF vector for the XM signals). Stated differently, the a priori speech estimate, $\tilde{z}_1$, is generated from assumptions such as microphone characteristics, location and reverberant characteristics of the speech within the sound signals detected by the LMA, and based on a real-time estimate of speech within the sound signals detected by the XM, which adhere to the same assumptions used for the LMA. The a priori speech estimate $\tilde{z}_1$, is an example of an a priori estimate of at least one target sound in the received sound signals.

In the case where the RTF vector for both the LMA and XM signals is to be estimated, a variation of (45) is considered:

$$\min_{\hat{R}_{x,r1}} \|(R_{yy} - R_{nn}) - \hat{R}_{x,r1}\|_F^2 \tag{51}$$

where $\hat{R}_{x,r1}$ is a rank-1 approximation to $R_{xx}$ (without any a priori information):

$$\hat{R}_{x,r1} = \hat{\Phi}_{x,r1}\hat{h}\hat{h}^H = \hat{\Phi}_{x,r1}\begin{bmatrix} \hat{q}_a \\ \hat{q}_e \end{bmatrix}[\hat{q}_a^H \;\; \hat{q}_e^H] \tag{52}$$

with $\hat{q}_a$ the estimated RTF vector for the LMA signals and $\hat{q}_e$ the RTF vector for the XM signals.

Once again, it will be convenient to re-frame the problem in the pre-whitened-transformed domain. From the derivations in Appendix D, the estimated RTF vector is given by:

$$\hat{h} = \begin{bmatrix} \hat{q}_a \\ \hat{q}_e \end{bmatrix} = \frac{TL \;\; q_{max}}{\eta_q} \tag{53}$$

where $q_{max}$ is a generalized eigenvector of the matrix pencil $\{\underline{R}_{yy}, \underline{R}_{nn}\}$, which as a result of the pre-whitening ($\underline{R}_{nn}=I_{M_a+M_e}$) corresponds to the principal (first in this case) eigenvector of $\underline{R}_{yy}$, $\eta_q=e_{x1}^T TL \; q_{max}$ and $e_{x1}=[10 \ldots 0|0 \ldots 0]^T$. The estimated RTF vector can therefore be used as an alternative to h for the $MVDR_{a,e}$:

$$\hat{w} = \frac{R_{nn}^{-1}\hat{h}}{\hat{h}^H R_{nn}^{-1}\hat{h}} \tag{54}$$

As derived in Appendix D, the corresponding speech estimate in the pre-whitened-transformed domain is given by:

$$\hat{z}_1 = \eta_q q_{max}^H \underbrace{L_\lambda^{-1} T^H y}_{\underline{y}} \tag{55}$$

$$\boxed{\hat{z}_1 = \eta_q q_{max}^H \underline{y}}$$

where $\eta_q{}^* q_{max}$ can be considered as a pre-whitened-transformed filter, which can be used to directly filter the pre-whitened-transformed signals, $\underline{y}$.

Figure 6:
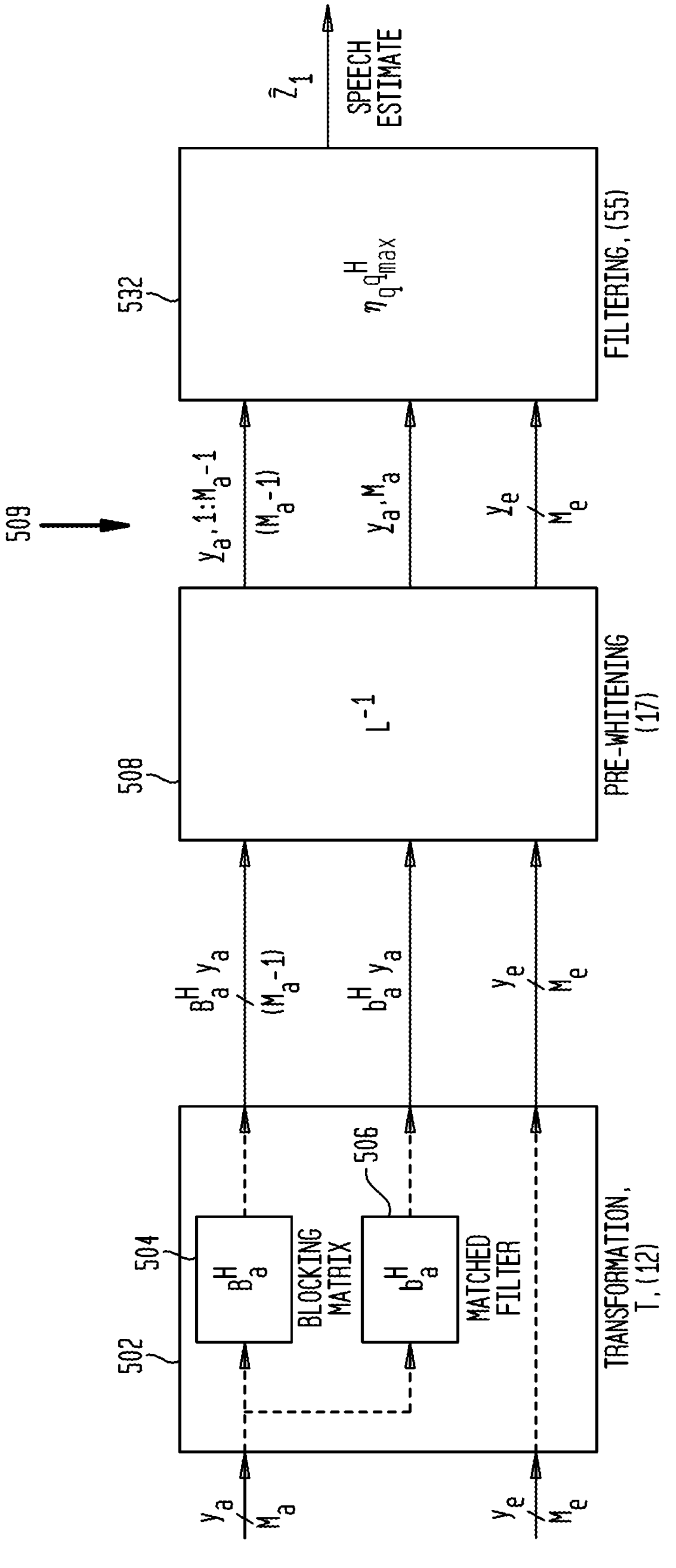
FIG. 6 is a functional block diagram illustrating the generation of a direct estimate of at least one target sound in sound signals received at a local microphone array and at least one external microphone.

More specifically, FIG. 6 is a block diagram illustrating a transformation block 502 representing the first transformation of section II-B, in which the LMA signals pass through a blocking matrix 504 and a matched filter 506, analogous to the first stage of a GSC. The XM signals are unaltered. The pre-whitening block 508 represents the pre-whitening operation. The output of the pre-whitening block 508 is signals in the pre-whitened-transformed domain, referred to as pre-whitened-transformed signals 509.

Also shown in FIG. 6 is filter 532 (i.e., (55), above), which uses the whitened-transformed signals 509 to generate a direct speech estimate, $\hat{z}_1$. As such, the direct speech estimate, $\hat{z}_1$, is a speech estimate using an estimated RTF vector including both the LMA and XM signals. Stated differently, the speech estimate, $\hat{z}_1$, is generated from a real-time estimate of the speech within the sound signals detected by both the LMA and XM, which takes into consideration microphone characteristics and may contain information such as the location and some reverberant characteristics of the target sound. The speech estimate $\hat{z}_1$, is an example of a direct estimate of at least one target sound in the received sound signals.

B. Integrated Beamformer

In the case of the integrated $MVDR_a$ for the LMA signals in section III-C, two general approaches for designing the beamformer were considered: one that imposes a priori assumptions for the definition of the RTF vector in the MVDR filter, and another that involves an estimation of this RTF vector. For the $MVDR_{a,e}$, two analogous approaches can also be considered: one that imposes a priori assumptions for the definition of the RTF vector for the LMA signals, while estimating only the RTF vector for the XM signals or an estimation of the entire RTF vector including both the LMA and XM signals. Although in both approaches there is an estimation; for the approach where only the RTF vector for the XM signals is estimated, it is done so in accordance with the a priori assumptions set by the LMA. Therefore, just as in the integrated $MVDR_a$, two general approaches to designing the $MVDR_{a,e}$ according to either a priori assumptions or full estimation can be considered. Consequently, an integrated $MVDR_{a,e}$ beamformer can also be derived in order to integrate the two general approaches. The resulting cost function, is:

$$\min_{w} w^H R_{nn} w + \alpha\left|w^H\tilde{h} - 1\right|^2 + \beta\left|w^H\hat{h} - 1\right|^2 \tag{56}$$

where $\tilde{h}$ is defined from (49) and $\hat{h}$ from (53). The solution is then:

$$w_{int} = g_{pr}(\alpha,\beta)\tilde{w} + g_{est}(\alpha,\beta)\hat{w} \tag{57}$$

where $\tilde{w}_\lambda$, and $\hat{w}_\lambda$, are given (48) and (54) respectively.

$$g_{pr}(\alpha, \beta) = \left[\frac{\alpha k_{hh}[1 + \beta(k_{qq} - k_{hq})]}{\alpha k_{hh} + \beta k_{qq} + \alpha\beta(k_{qq}k_{hh} - k_{hq}k_{qh}) + 1}\right] \tag{58}$$

$$g_{est}(\alpha, \beta) = \left[\frac{\beta k_{qq}[1 + \alpha(k_{qq} - k_{hq})]}{\alpha k_{hh} + \beta k_{qq} + \alpha\beta(k_{qq}k_{hh} - k_{hq}k_{qh}) + 1}\right] \tag{59}$$

with the constants:

$$\begin{aligned} k_{hh} &= \tilde{h}^H R_{nn}^{-1}\tilde{h}; \\ k_{qq} &= \hat{h}^H R_{nn}^{-1}\hat{h}; \\ k_{hq} &= \tilde{h}^H R_{nn}^{-1}\tilde{h}; \\ k_{qh} &= \hat{h}_a^H R_{nn}^{-1}\tilde{h} \end{aligned} \tag{60}$$

As in section III-C, this integrated $MVDR_{a,e}$ beamformer also reveals that the $MVDR_{a,e}$ beamformer based on a priori assumptions from (48) and that which is based on estimated quantities from (54) can be combined according to the functions $g_{pr}(\alpha,\beta)$ and $g_{est}(\alpha,\beta)$ respectively.

This integrated beamformer can also be expressed in the pre-whitened-transformed domain as follows:

$$w_{int_\lambda} = g_{pr}(\alpha, \beta)TL^{-H}\frac{l_{M_a}v_1}{\|\tilde{h}_a\|}Jv_{max} + g_{est}(\alpha, \beta)TL^{-H}\eta_q q_{max} \tag{61}$$

and the constants equivalently, but alternatively defined as:

$$\begin{aligned} k_{hh} &= \underline{\tilde{h}}^H\underline{\tilde{h}}; \\ k_{qq} &= \underline{\hat{h}}^H\underline{\hat{h}}; \\ k_{hq} &= \underline{\tilde{h}}^H\underline{\hat{h}}; \\ k_{qh} &= \underline{\hat{h}}^H\underline{\tilde{h}} \end{aligned} \tag{62}$$

where $\underline{\tilde{h}}$ and $\underline{\hat{h}}$ are given in (88) from Appendix C and (97) from Appendix D respectively.

The resulting speech estimate from this integrated beamformer is then given by:

$$\hat{z}_{int} = g_{pr}^*(\alpha, \beta)\frac{l_{M_a}v_1}{\|\tilde{h}_a\|}v_{max}^H\begin{bmatrix}\underline{y}_{a,M_a}\\ \underline{y}_e\end{bmatrix} + g_{est}^*(\alpha, \beta)\eta_p q_{max}^H\underline{y} \tag{63}$$

$$\boxed{\hat{z}_{int} = g_{pr}^*(\alpha, \beta)\tilde{z}_1 + g_{est}^*(\alpha, \beta)\hat{z}_1}$$

The benefit of the pre-whitened-transformed domain is once again apparent. With such an integrated beamformer, the transformed, pre-whitened signals can be directly filtered accordingly, and then combined with the appropriate weightings as defined by the functions $g_{pr}(\alpha,\beta)$ and $g_{est}(\alpha,\beta)$, to yield the respective speech estimate. These functions $g_{pr}(\alpha,\beta)$ and $g_{est}(\alpha,\beta)$ can be tuned such as to emphasize the result from an MVDR beamformer that uses either an a priori assumed RTF vector or an estimated RTF vector. This results in a digital signal processing scheme as depicted in FIG. 7.

Figure 7:
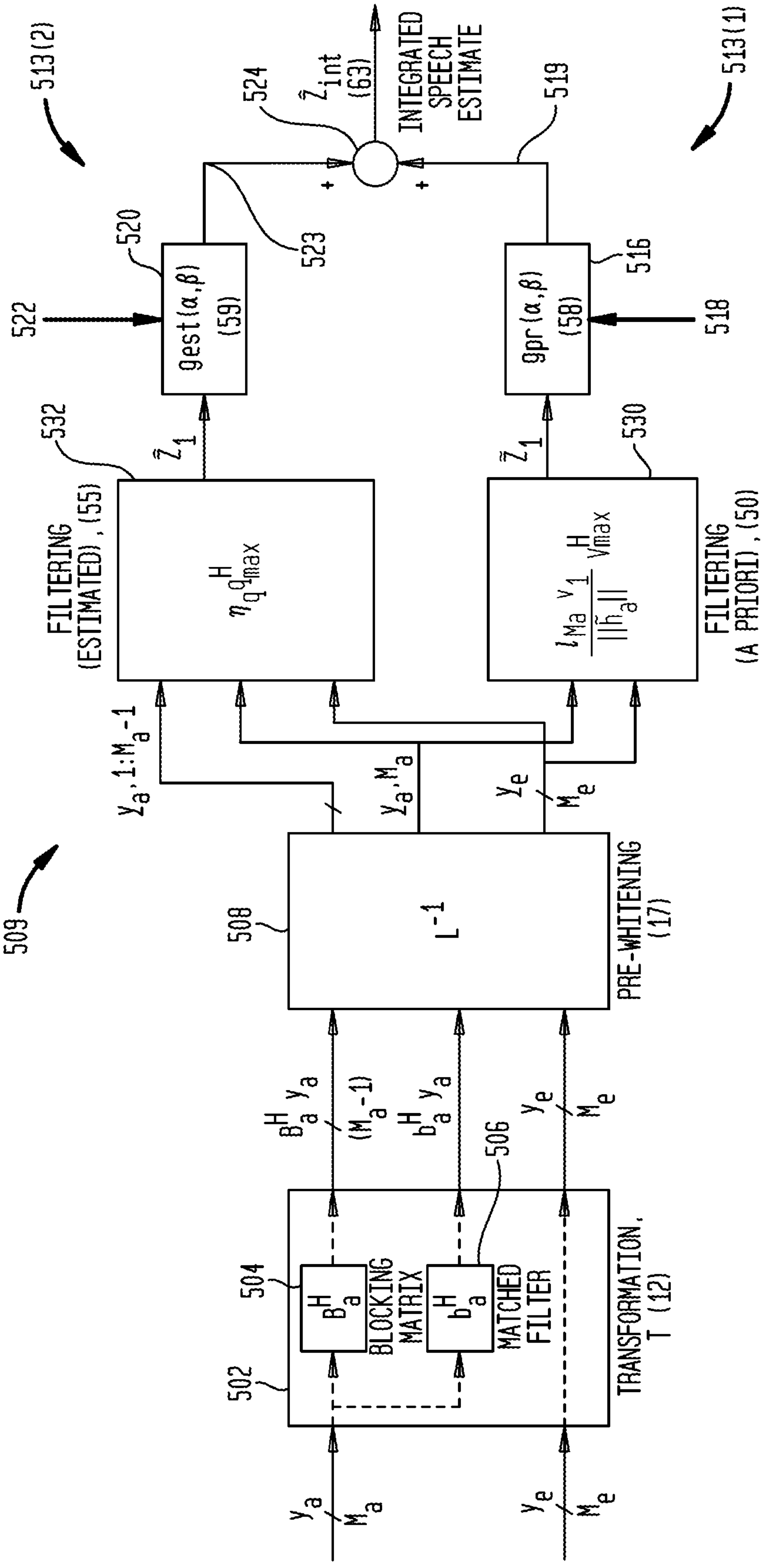
FIG. 7 is a functional block diagram illustrating the generation of an integrated estimate of at least one target sound in sound signals received at a local microphone array and at least one external microphone.

More specifically, FIG. 7 is a block diagram of an integrated $MVDR_{a,e}$ beamformer 525 in accordance with embodiments presented herein. The integrated $MVDR_{a,e}$ beamformer 525 comprises a plurality of processing blocks, which include transformation block 502 and pre-whitening block 508. As described above with reference to FIGS. 5 and 6, the transformation block 502 represent the first transformation of section II-B, in which the LMA signals pass through a blocking matrix 504 and a matched filter 506, while the XM signals are unaltered. The pre-whitening block 508 represents the pre-whitening operation. The output of the pre-whitening block 508 is signals in the pre-whitened-transformed domain, referred to as pre-whitened-transformed signals 509.

Also shown in FIG. 7 are two processing branches 513(1) and 513(2) that each operate based on all or part of the pre-whitened-transformed signals 509. The first processing branch 513(1) includes a filter 530 which, as described above with reference to FIG. 5, uses the whitened-transformed signals 509 to generate an a priori speech estimate, $\tilde{z}_1$ (i.e., an estimate of the speech in the received sound signals, based on a priori assumptions for the definition of the RTF vector for the LMA signals, while estimating only the RTF vector for the XM signals). The speech estimate $\tilde{z}_1$, is an example of an a priori estimate of at least one target sound in the received sound signals.

The first branch 513(1) also comprises a first weighting block 516. The first weighting block 516 is configured to weight the speech estimate, $\tilde{z}_1$, in accordance with the complex conjugate of the function $g_{pr}(\alpha,\beta)$ (i.e., (58) and (63), above). More generally, the first weighting block 516 is configured to weight the speech estimate, $\tilde{z}_1$, in accordance with a cost function controlled by a plurality of tuning parameters (e.g., $(\alpha,\beta)$). The tuning parameters of the cost function (e.g., $g_{pr}(\alpha,\beta)$), are set based on one or more confidence measures 518 generated for the speech estimate, $\tilde{z}_1$. The one or more confidence measures 518 represent an assessment or estimate of the accuracy/reliability of the speech estimate, $\tilde{z}_1$, and the hence the accuracy of the partial a priori assumed RTF vector and partial estimated RTF vector used to generate the speech estimate (i.e., using a priori assumptions for the definition of the RTF vector for the LMA signals, while estimating only the RTF vector for the XM signals). The first weighting block 518 generates a weighted a priori speech estimate, shown in FIG. 5 by arrow 519.

The second branch 513(2) includes the filter 532 (i.e., (55), above), which uses the whitened-transformed signals 509 to generate a direct speech estimate, $\hat{z}_1$ (i.e., a speech estimate generated using an estimated RTF vector including both the LMA and XM signals). The second branch 513(2) also comprises a second weighting block 520. The second weighting block 520 is configured to weight the direct speech estimate, $\hat{z}_1$, in accordance with the complex conjugate of the function $g_{est}(\alpha,\beta)$ (i.e., (59) and (63), above). More generally, the second weighting block 120 is configured to weight the direct speech estimate, $\hat{z}_1$, in accordance with a cost function controlled by a plurality of tuning parameters (e.g., $(\alpha,\beta)$). The tuning parameters of the cost function (e.g., $g_{est}(\alpha,\beta)$ are set based on one or more confidence measures 522 generated for the speech estimate, $\hat{z}_1$. The one or more confidence measures 522 represent an assessment or estimate of the accuracy/reliability of the speech estimate, $\hat{z}_1$, and the hence the accuracy of the estimated RTF vector including both the LMA and XM signals. The second weighting block 520 generates a weighted direct speech estimate, shown in FIG. 5 by arrow 123.

FIG. 7 also illustrates processing block 524 which integrates/combines the weighted a priori speech estimate 519 and the weighted direct speech estimate 523. The combination of the weighted a priori speech estimate 519 and the weighted direct speech estimate 523 is referred to as an integrated speech estimate, $\hat{z}_{int}$ (i.e., (63), above). The integrated speech estimate, $\hat{z}_{int}$, may be used for subsequent processing in the device (e.g., auditory prosthesis).

Figure 8:
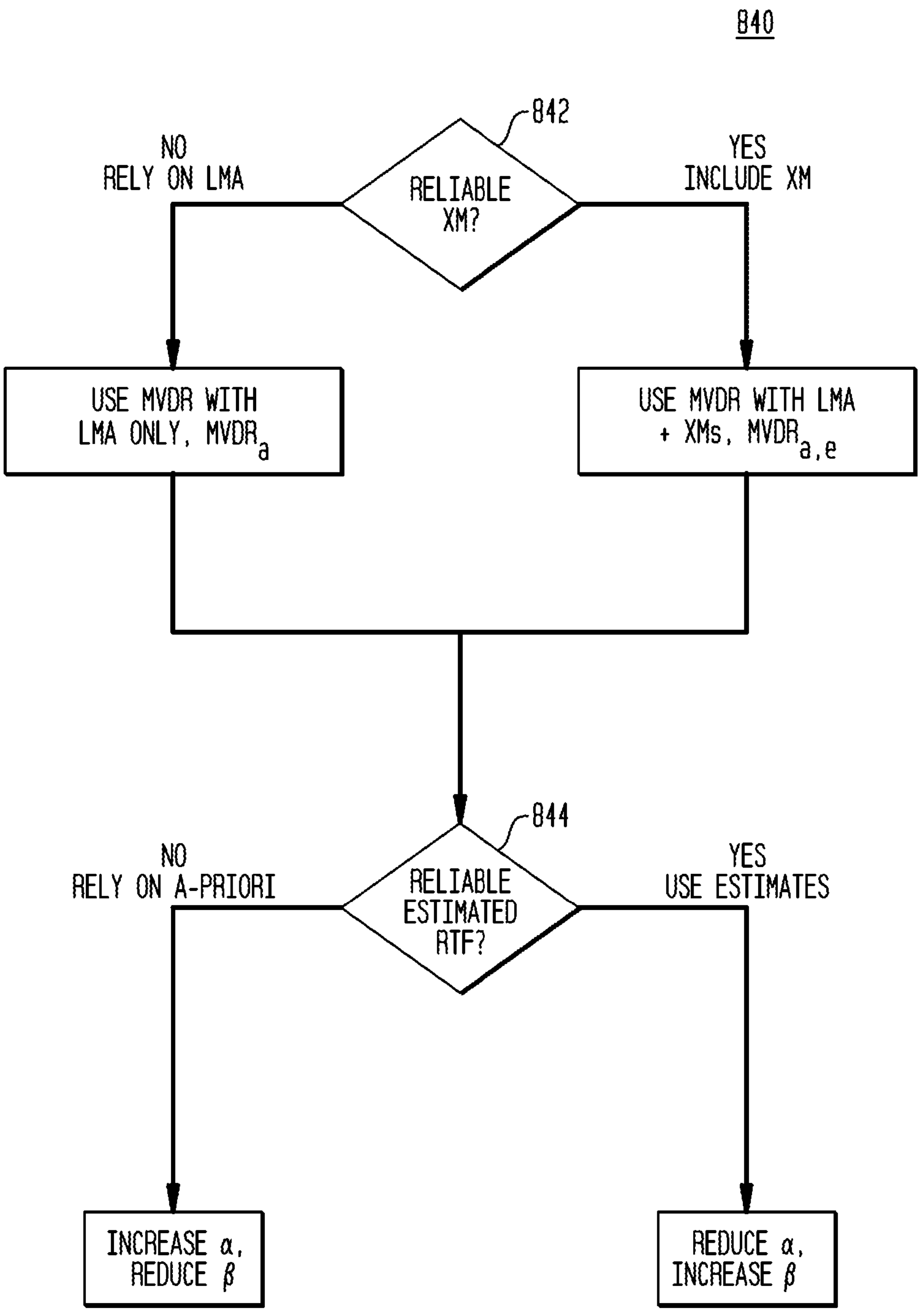
FIG. 8 is flowchart of a two stage process, in accordance with embodiments presented herein.

With this integrated beamformer for both the LMA and XMs, the decision process is now, as shown in the flowchart of FIG. 8, a two stage process 840. More specifically, the process 840 is comprised of two main decisions, referred to as decisions 842 and 844. Referring first to 842, it can be determined whether or not the XM signals are reliable (i.e., decide whether or not to use the XM signals). If the XM signals are not reliable, the system uses MVDR with LMA only (i.e., $\text{MVDR}_a$). If the XM signals are reliable, the system uses MVDR with LMA and XMs (i.e., $\text{MVDR}_{a,e}$).

At 844, after determining whether or not the XM signals should be used, a decision is made as to whether or not estimated RTF vector is reliable. In other words, a decision can then be made on how much to weight the a priori assumed RTF vector and the estimated RTF vector. This decision is controlled by a and in the same manner as for the Integrated $\text{MVDR}_a$ Beamformer from section III-C. In the case where the XM is used, the a priori assumed RTF vector consists of an a priori assumed RTF vector for the LMA signals and an estimated RTF vector for the XM signals, the estimated RTF vector is for both the LMA and XM signals.

In the second stage of the decision process, it should be noted that in order to simplify the tuning, a and could be made inversely proportional, and can even be tuned such that $g_{pr}(\alpha,\beta)$ and $g_{est}(\alpha,\beta)$ form a convex combination. Alternatively, if it is imposed that $\alpha\rightarrow\infty$, then this preserves the a priori constraint and it is only that remains to be tuned, which would be that of a contingency noise reduction strategy. In the case where both $\alpha\rightarrow\infty$ and $\beta\rightarrow\infty$, this corresponds to two hard constraints imposed upon the noise minimization, and is then considered as a linearly constrained minimum variance (LCMV) beamformer. It is also noted for the case of the $\text{MVDR}_a$ where $\alpha\rightarrow\infty$, =0, that the original $\text{MVDR}_a$ with a priori constraints is achieved. Hence, the original beamformer has not been compromised and can be reverted to at anytime with this particular tuning.

A summary of the various noise reduction strategies encompassed by this integrated beamformer is summarized in FIG. 9. More specifically, FIG. 9 includes a table, referred to as Table I, which illustrates limiting cases of a, for the various MVDR beamformers.

The integrated noise reduction techniques presented herein may be implemented in a number of devices/systems that include a local microphone array (LMA) to capture sound signals. These devices/systems include, for example, auditory prostheses (e.g., cochlear implant, acoustic hearing aids, auditory brainstem stimulators, bone conduction devices, middle ear auditory prostheses, direct acoustic stimulators, bimodal auditory prosthesis, bilateral auditory prostheses, etc.), computing devices (e.g., mobile phones, tablet computers, etc.), conference phones, hands-free telephone systems, etc. FIGS. 10A, 10B, 11, and 12 are schematic block diagrams of example devices configured to implement the integrated noise reduction techniques presented herein. It is to be appreciated that these examples are illustrative and that, as noted, the integrated noise reduction techniques presented herein may be implemented in a number of different devices/systems.

Figure 10A:
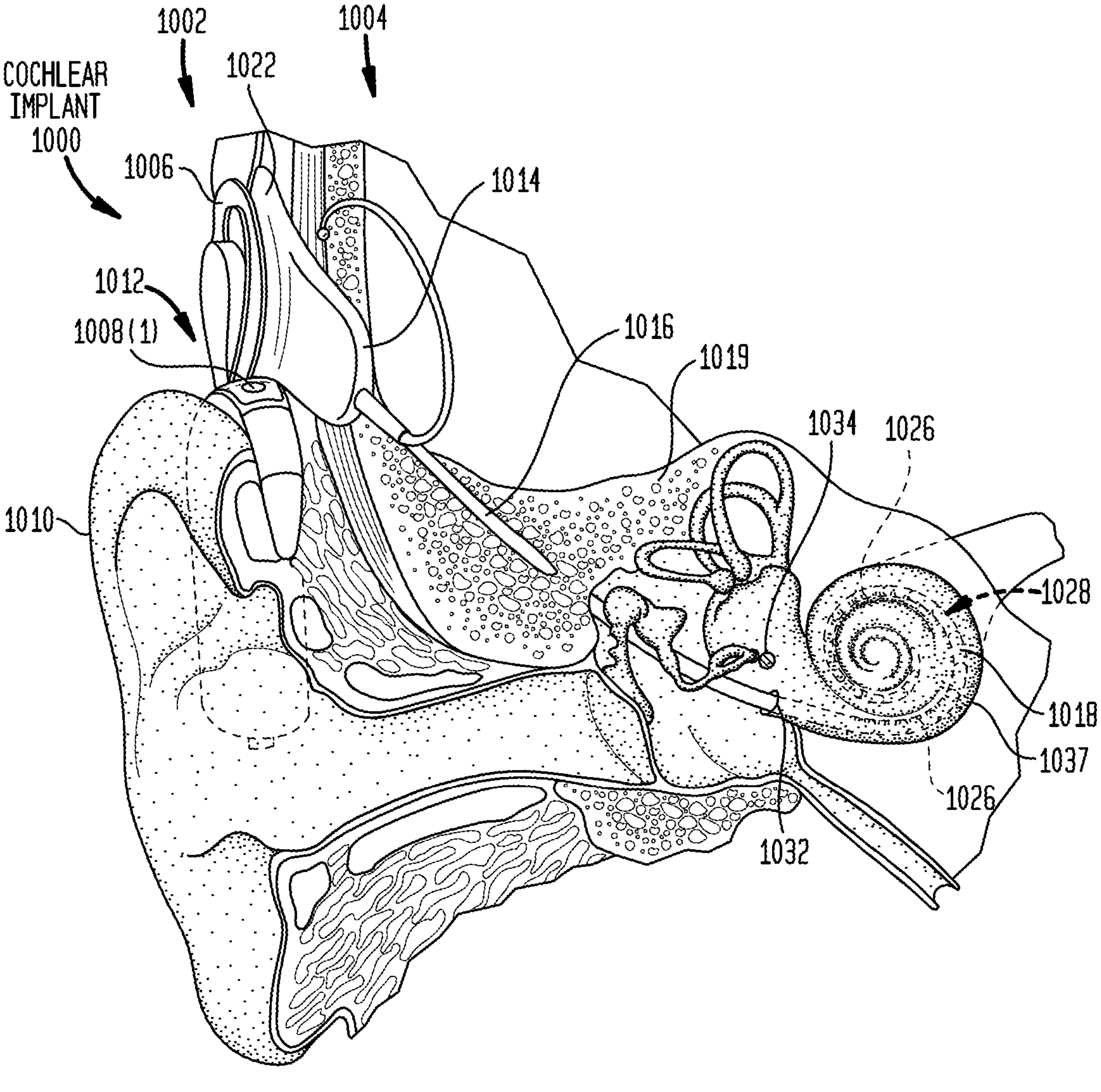
FIG. 10A is a schematic diagram illustrating a cochlear implant, in accordance with certain embodiments presented herein.
Figure 10B:
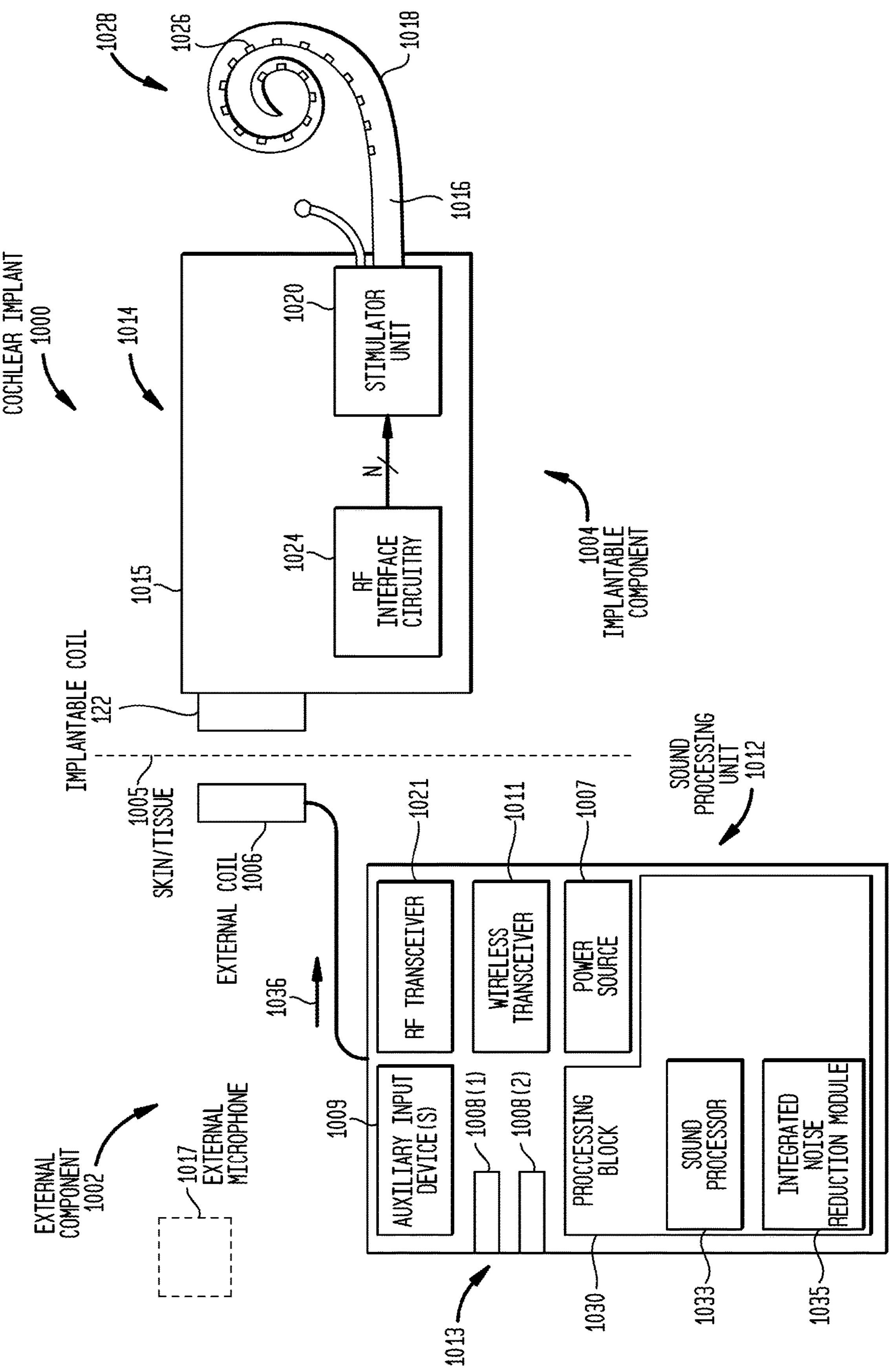
FIG. 10B is a block diagram of the cochlear implant of FIG. 10A.

Referring first to FIG. 10A, shown is a schematic diagram of an exemplary cochlear implant 1000 configured to implement aspects of the techniques presented herein, while FIG. 10B is a block diagram of the cochlear implant 1000. For ease of illustration, FIGS. 10A and 10B will be described together.

The cochlear implant 1000 comprises an external component 1002 and an internal/implantable component 1004. The external component 1002 includes a sound processing unit 1012 that is directly or indirectly attached to the body of the recipient, an external coil 1006 and, generally, a magnet (not shown in FIG. 10A) fixed relative to the external coil 1006.

The sound processing unit 1012 comprises a local microphone array (LMA) 1013, comprised of microphones 1008 (1) and 1008(2), configured to receive sound input signals. In this example, the sound processing unit 1012 may also include one or more auxiliary input devices 1009, such as one or more telecoils, audio ports, data ports, cable ports, etc., and a wireless transmitter/receiver (transceiver) 1011.

The sound processing unit 1012 also includes, for example, at least one battery 1007, a radio-frequency (RF) transceiver 1021, and a processing block 1050. The processing block 1050 comprises a number of elements, including an integrated noise reduction module 1025 and a sound processor 1033. The processing block 1050 may also include other elements that, have for ease of illustration, been omitted from FIG. 10B. Each of the integrated noise reduction module 1025 and a sound processor 1033 may be formed by one or more processors (e.g., one or more Digital Signal Processors (DSPs), one or more uC cores, etc.), firmware, software, etc. arranged to perform operations described herein. That is, the integrated noise reduction module 1025 and a sound processor 1033 may each be implemented as firmware elements, partially or fully implemented with digital logic gates in one or more application-specific integrated circuits (ASICs), partially or fully implemented in software, etc.

The integrated noise reduction module 1025 is configured to perform the integrated noise reduction techniques described elsewhere herein. For example, the integrated noise reduction module 1025 corresponds to the integrated $MVDR_a$ beamformer 125 and the $MVDR_{a,e}$ beamformer 525, described above. As such, in different embodiments, the integrated noise reduction module 1025 may include the processing blocks described above with reference to FIGS. 4 and 7, as well as other combinations of processing blocks configured to perform the integrated noise reduction techniques described elsewhere herein.

As noted above, the integrated noise reduction techniques, and thus the integrated noise reduction module 1025, generates an integrated speech estimate from sound signals received via at least the LMA 1013. Shown in FIG. 10 is at least one optional external microphone (XM) which may also be in communication with the sound processing unit 1012. If present, the XM 1017 is configured to capture sound signals and provide XM signals to the sound processing unit 1012. These XM signals may also be used to generate the integrated speech estimate. The sound processor 1033 is configured to use the integrated speech estimate (generated from one or both of the LMA signals and the XM signals) to generate stimulation signals for delivery to the recipient.

Returning to the example embodiment of FIGS. 10A and 10B, the implantable component 1004 comprises an implant body (main module) 1014, a lead region 1016, and an intra-cochlear stimulating assembly 1018, all configured to be implanted under the skin/tissue (tissue) 1005 of the recipient. The implant body 1014 generally comprises a hermetically-sealed housing 1015 in which RF interface circuitry 1024 and a stimulator unit 1020 are disposed. The implant body 1014 also includes an internal/implantable coil 1022 that is generally external to the housing 1015, but which is connected to the RF interface circuitry 1024 via a hermetic feedthrough (not shown in FIG. 10B).

As noted, stimulating assembly 1018 is configured to be at least partially implanted in the recipient's cochlea 1037. Stimulating assembly 1018 includes a plurality of longitudinally spaced intra-cochlear electrical stimulating contacts (electrodes) 1026 that collectively form a contact or electrode array 1028 for delivery of electrical stimulation (current) to the recipient's cochlea. Stimulating assembly 1018 extends through an opening in the recipient's cochlea (e.g., cochleostomy, the round window, etc.) and has a proximal end connected to stimulator unit 1020 via lead region 1016 and a hermetic feedthrough (not shown in FIG. 10B). Lead region 1016 includes a plurality of conductors (wires) that electrically couple the electrodes 1026 to the stimulator unit 1020.

As noted, the cochlear implant 1000 includes the external coil 1006 and the implantable coil 1022. The coils 1006 and 1022 are typically wire antenna coils each comprised of multiple turns of electrically insulated single-strand or multi-strand platinum or gold wire. Generally, a magnet is fixed relative to each of the external coil 1006 and the implantable coil 1022. The magnets fixed relative to the external coil 1006 and the implantable coil 1022 facilitate the operational alignment of the external coil with the implantable coil. This operational alignment of the coils 1006 and 1022 enables the external component 1002 to transmit data, as well as possibly power, to the implantable component 1004 via a closely-coupled wireless link formed between the external coil 1006 with the implantable coil 1022. In certain examples, the closely-coupled wireless link is a radio frequency (RF) link. However, various other types of energy transfer, such as infrared (IR), electromagnetic, capacitive and inductive transfer, may be used to transfer the power and/or data from an external component to an implantable component and, as such, FIG. 10B illustrates only one example arrangement.

As noted above, the integrated noise reduction module 1025 is configured to generate an integrated speech estimate, and the sound processor 1033 is configured to use the integrated speech estimate to generate stimulation signals for delivery to the recipient. More specifically, the sound processor 1033 (e.g., one or more processing elements implementing firmware, software, etc.) is configured to use the integrated speech estimate to generate stimulation control signals 1036 that represent electrical stimulation for delivery to the recipient. In the embodiment of FIG. 10B, the stimulation control signals 1036 are provided to the RF transceiver 1021, which transcutaneously transfers the stimulation control signals 1036 (e.g., in an encoded manner) to the implantable component 1004 via external coil 1006 and implantable coil 1022. That is, the stimulation control signals 1036 are received at the RF interface circuitry 1024 via implantable coil 1022 and provided to the stimulator unit 1020. The stimulator unit 1020 is configured to utilize the stimulation control signals 1036 to generate electrical stimulation signals (e.g., current signals) for delivery to the recipient's cochlea via one or more stimulating contacts 1026. In this way, cochlear implant 1000 electrically stimulates the recipient's auditory nerve cells, bypassing absent or defective hair cells that normally transduce acoustic vibrations into neural activity, in a manner that causes the recipient to perceive one or more components of the input audio signals.

FIGS. 10A and 10B illustrate an arrangement in which the cochlear implant 1000 includes an external component. However, it is to be appreciated that embodiments of the present invention may be implemented in cochlear implants having alternative arrangements. For example, the techniques presented herein could also be implemented in a totally implantable or mostly implantable auditory prosthesis where components shown in sound processing unit 1012, such as processing block 1050, could instead be implanted in the recipient.

Figure 11:
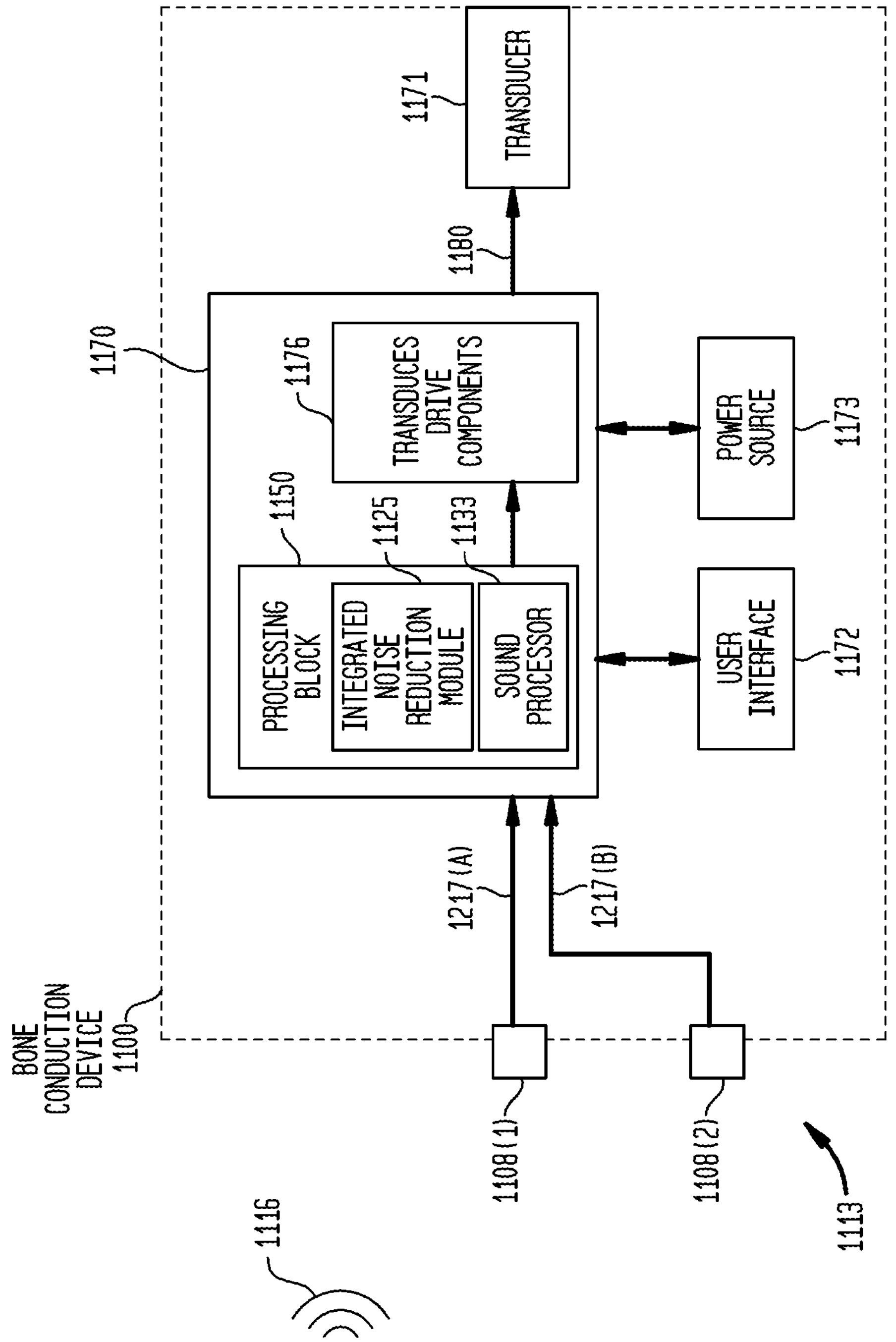
FIG. 11 is a block diagram of a totally implantable cochlear implant, in accordance with certain embodiments presented herein.

FIG. 11 is a functional block diagram of one example arrangement for a bone conduction device 1100 in accordance with embodiments presented herein. Bone conduction device 1100 is configured to be positioned at (e.g., behind) a recipient's ear. The bone conduction device 1100 comprises a microphone array 1113, an electronics module 1170, a transducer 1171, a user interface 1172, and a power source 1173.

The local microphone array (LMA) 1113 comprises microphones 1108(1) and 1108(2) that are configured to convert received sound signals 1116 into LMA signals.

Although not shown in FIG. 11, bone conduction device 1100 may also comprise other sound inputs, such as ports, telecoils, etc.

The LMA signals are provided to electronics module 1170 for further processing. In general, electronics module 1170 is configured to convert the LMA signals into one or more transducer drive signals 1180 that active transducer 1171. More specifically, electronics module 1170 includes, among other elements, a processing block 1150 and transducer drive components 1176.

The processing block 1174 comprises a number of elements, including an integrated noise reduction module 1125 and sound processor 1133. Each of the integrated noise reduction module 1125 and the sound processor 1133 may be formed by one or more processors (e.g., one or more Digital Signal Processors (DSPs), one or more uC cores, etc.), firmware, software, etc. arranged to perform operations described herein. That is, the integrated noise reduction module 1125 and the sound processor 1133 may each be implemented as firmware elements, partially or fully implemented with digital logic gates in one or more application-specific integrated circuits (ASICs), partially or fully in software, etc.

The integrated noise reduction module 1125 is configured to perform the integrated noise reduction techniques described elsewhere herein. For example, the integrated noise reduction module 1125 corresponds to the integrated $MVDR_a$ beamformer 125 and the $MVDR_{a,e}$ beamformer 525, described above. As such, in different embodiments, the integrated noise reduction module 1125 may include the processing blocks described above with reference to FIGS. 4 and 7, as well as other combinations of processing blocks configured to perform the integrated noise reduction techniques described elsewhere herein. Although not shown in FIG. 11 is at least one optional external microphone (XM) may be in communication with the bone conduction device 1100. If present, the XM is configured to capture sound signals and provide XM signals to the conduction device 1100 for processing by the integrated noise reduction module 1125 (i.e., the XM signals may also be used to generate the integrated speech estimate).

The sound processor 1133 is configured to process the integrated speech estimate (generated from one or both of the LMA signals and the XM signals) for use by the transducer drive components 1176. The transducer drive components 1176 generate transducer drive signal(s) 1180 which are provided to the transducer 1171. The transducer 1171 illustrates an example of a stimulation unit that receives the transducer drive signal(s) 1180 and generates vibrations for delivery to the skull of the recipient via a transcutaneous or percutaneous anchor system (not shown) that is coupled to bone conduction device 1100. Delivery of the vibration causes motion of the cochlea fluid in the recipient's contralateral functional ear, thereby activating the hair cells in the functional ear.

FIG. 11 also illustrates the power source 1173 that provides electrical power to one or more components of bone conduction device 1300. Power source 1173 may comprise, for example, one or more batteries. For ease of illustration, power source 1173 has been shown connected only to user interface 1172 and electronics module 1170. However, it should be appreciated that power source 1173 may be used to supply power to any electrically powered circuits/components of bone conduction device 1100.

User interface 1172 allows the recipient to interact with bone conduction device 1100. For example, user interface 1172 may allow the recipient to adjust the volume, alter the speech processing strategies, power on/off the device, etc. Although not shown in FIG. 11, bone conduction device 1100 may further include an external interface that may be used to connect electronics module 1170 to an external device, such as a fitting system.

Figure 12:
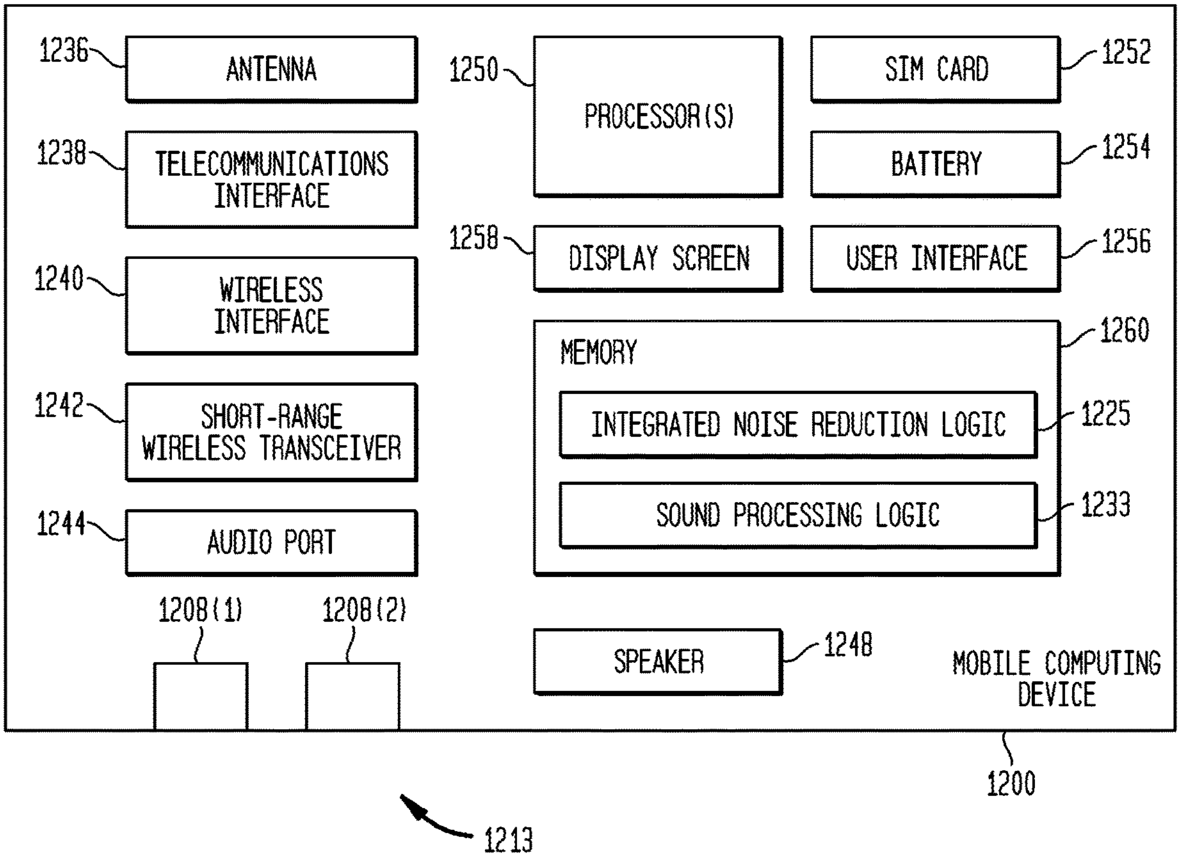
FIG. 12 is a block diagram of a bone conduction device that includes a spatial pre-filter, in accordance with embodiments presented herein.

FIG. 12 is a block diagram of an arrangement of a mobile computing device 1200, such as a smartphone, configured to be implemented the integrated noise reduction techniques presented herein. It is to be appreciated that FIG. 12 is merely illustrative.

Mobile computing device 1200 first comprises an antenna 1236 and a telecommunications interface 1238 that are configured for communication on a telecommunications network. The telecommunications network over which the radio antenna 1236 and the radio interface 1238 communicate may be, for example, a Global System for Mobile Communications (GSM) network, code division multiple access (CDMA) network, time division multiple access (TDMA), or other kinds of networks.

The mobile computing device 1200 also includes a wireless local area network interface 1240 and a short-range wireless interface/transceiver 1242 (e.g., an infrared (IR) or Bluetooth® transceiver). Bluetooth® is a registered trademark owned by the Bluetooth® SIG. The wireless local area network interface 1240 allows the mobile computing device 1200 to connect to the Internet, while the short-range wireless transceiver 1242 enables the external device 1206 to wirelessly communicate (i.e., directly receive and transmit data to/from another device via a wireless connection), such as over a 2.4 Gigahertz (GHz) link. It is to be appreciated that that any other interfaces now known or later developed including, but not limited to, Institute of Electrical and Electronics Engineers (IEEE) 802.11, IEEE 802.16 (WiMAX), fixed line, Long Term Evolution (LTE), etc., may also or alternatively form part of the mobile computing device 1200.

In the example of FIG. 12, mobile computing device 1200 also comprises an audio port 1244, a local microphone array (LMA) 1213, a speaker 1248, a display screen 1258, a subscriber identity module or subscriber identification module (SIM) card 1252, a battery 1254, a user interface 1256, one or more processors 1250, and a memory 1260. The LMA 1213 includes microphones 1208(1) and 1208(2). Stored in memory 1260 is integrated noise reduction logic 1225 and sound processing logic 1233.

The display screen 1258 is an output device, such as a liquid crystal display (LCD), for presentation of visual information to the cochlear implant recipient. The user interface 1256 may take many different forms and may include, for example, a keypad, keyboard, mouse, touchscreen, display screen, etc. Memory 1260 may comprise any one or more of read only memory (ROM), random access memory (RAM), magnetic disk storage media devices, optical storage media devices, flash memory devices, electrical, optical, or other physical/tangible memory storage devices. The one or more processors 1258 are, for example, microprocessors or microcontrollers that execute instructions for the integrated noise reduction logic 1225 and sound processing logic 1233.

When executed by the one or more processors 1250, the integrated noise reduction logic 1225 is configured to perform the integrated noise reduction techniques described elsewhere herein. For example, the integrated noise reduction logic 1225 corresponds to the integrated $MVDR_a$ beamformer 125 and the $MVDR_{a,e}$ beamformer 525, described above. As such, in different embodiments, the integrated noise logic 1225 may include software forming the processing blocks described above with reference to FIGS. 4 and 7, as well as other combinations of processing blocks configured to perform the integrated noise reduction techniques described elsewhere herein to generate an integrated noise estimate. When executed by the one or more processors 1250, the sound processing logic 1233 is configured to perform sound processing operations using the integrated noise estimate.

Figure 13:
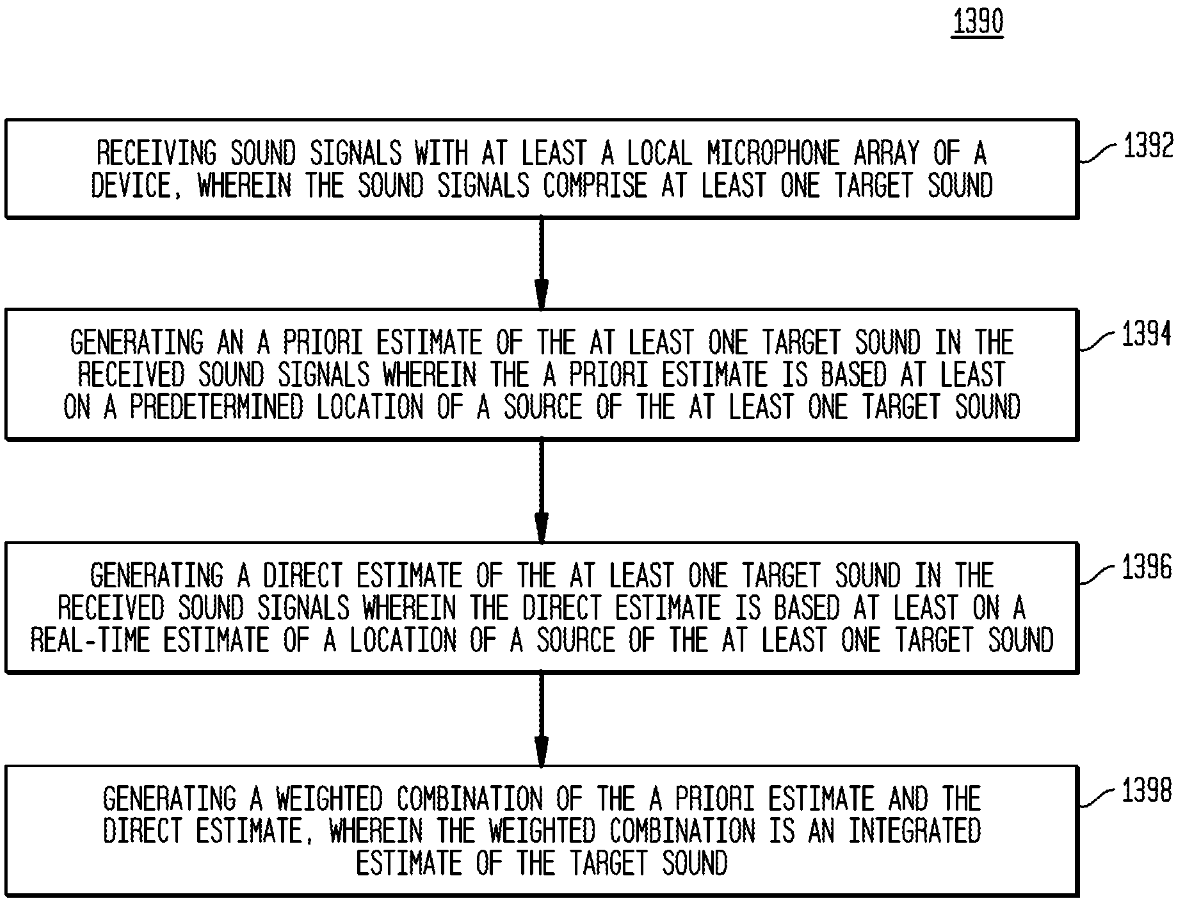
FIG. 13 is a flowchart of a method, in accordance with embodiments presented herein.

FIG. 13 is a flowchart of a method 1390 performed/executed by a device comprising at least a local microphone array (LMA), in accordance with embodiments presented herein. Method 1390 begins at 1392 where sound signals are received with at least the local microphone array of the device. The received sound signals comprise/include at least one target sound.

At 1394, an a priori estimate of the at least one target sound in the received sound signals is generated, wherein the a priori estimate is based at least on a predetermined location of a source of the at least one target sound. At 1396, a direct estimate of the at least one target sound in the received sound signals is generated, wherein the direct estimate is based at least on a real-time estimate of a location of a source of the at least one target sound. At 1398, a weighted combination of the a priori estimate and the direct estimate is generated, where the weighted combination is an integrated estimate of the target sound. Subsequent sound processing operations may be performed in the device using the integrated estimate of the target sound.

In certain embodiments, the a priori estimate of the at least one target sound is generated using only an a priori relative transfer function (RTF) vector generated from the received sound signals. In certain embodiments, the direct estimate of the at least one target sound is generated using only an estimated relative transfer function (RTF) vector for the received sound signals.

In certain embodiments, the weighted combination of the a priori estimate and the direct estimate is generated by weighting the a priori estimate in accordance with a first cost function controlled by a first set of tuning parameters to generate a weighted a priori estimate; and weighting the direct estimate in accordance with a second cost function controlled by a second set of tuning parameters to generate a weighted direct estimate. The weighted direct estimate with the weighted a priori estimate are then mixed with one another. The first set of tuning parameters may be set based on one or more confidence measures associated with the a priori estimate of the of the at least one target sound, wherein the one or more confidence measures represent an estimate of a reliability of the a priori estimate. The second set of tuning parameters may be set based on one or more confidence measures associated with the direct estimate of the of the at least one target sound, wherein the one or more confidence measures represent an estimate of a reliability of the direct estimate.

As detailed above, presented herein are integrated noise reduction techniques, sometimes referred to as an integrated beamformer (e.g., an integrated $MVDR_a$ beamformer or an integrated $MVDR_{a,e}$ beamformer). In general, the integrated noise reduction techniques combine the use of an apriori (i.e., predetermined, assumed, or pre-defined) location of a target sound source with a real-time estimated location of the sound source.

It is to be appreciated that the above described embodiments are not mutually exclusive and that the various embodiments can be combined in various manners and arrangements.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

APPENDIX

I. Appendix A—$MVDR_a$ with a Priori Assumed RTF Vector

A pre-whitened-transformed version of the a priori assumed RTF vector can be considered where:

$$\underline{\tilde{h}}_a = L_a^{-1} T_a^H \tilde{h}_a = \begin{bmatrix} 0 \\ \vdots \\ 0 \\ \frac{\|\tilde{h}_a\|}{l_{M_a}} \end{bmatrix} \tag{64}$$

where $l_{M_a}$ is the bottom-right element in $L_a$. Using the definition from (16), i.e., $R_{n_a n_a}{}^{-1} = (T_a L_a L_a{}^H T_a{}^H)^{-1} = T_a L_a{}^{-H} L_a{}^{-1} T_a{}^H$, the $MVDR_a$ filter of (25) can then be re-written as:

$$\tilde{w}_a = T_a L_a^{-H} \underline{\tilde{w}}_a \tag{65}$$

where $$\underline{\tilde{w}}_a = \frac{\underline{\tilde{h}}_a}{\underline{\tilde{h}}_a^H \underline{\tilde{h}}_a} = \begin{bmatrix} 0 \\ \vdots \\ 0 \\ \underline{\tilde{w}}_{a,M_a} \end{bmatrix} = \begin{bmatrix} 0 \\ \vdots \\ 0 \\ \frac{l_{M_a}}{\|\tilde{h}_a\|} \end{bmatrix} \tag{66}$$

Substitution of (65) into (26) yields the speech estimate as:

$$\begin{aligned} \tilde{z}_{a,1} &= \underline{\tilde{w}}_a^H \underbrace{L_a^{-1} T_a^H y_a}_{\underline{y}_a} \\ &= \frac{l_{M_a}}{\|\tilde{h}_a\|} \underline{y}_{a,M_a} \end{aligned} \tag{67}$$

II. Appendix B $MVDR_a$ with Estimated RTF Vector

As opposed to using the raw signal correlation matrices, the estimation problem of (28) can be equivalently formulated first in the transformed domain since the Frobenius norm is invariant under a unitary transformation, therefore:

$$\min_{\hat{R}_{xa,r1}} \left\| T_a^H \left( \left( R_{y_a y_a} - R_{n_a n_a} \right) - \hat{R}_{xa,r1} \right) T_a \right\|_F^2 \tag{68}$$

Furthermore, it is argued in that spatial pre-whitening should also be included in the optimisation problem. Consequently, the estimation problem can be re-framed in the pre-whitened-transformed domain as follows:

$$\min_{\hat{R}_{xa,r1}} \left\|\left(\underline{R}_{y_a y_a} - \underline{R}_{n_a n_a}\right) - L_a^{-1} T_a^H \hat{R}_{xa,r1} T_a L_a^{-H}\right\|_F^2 \tag{69}$$

where $\underline{R}_{y_a y_a} = L_a^{-1} T_a^{H} R_{y_a y_a} T_a L_a^{-H}$, and $R_{n_a n_a} = L_a^{-1} T_a^{H} R_{n_a n_a} T_a L_a^{-H} = I_{M_a}$. The solution then follows from the GEVD on the matrix pencil $\{\underline{R}_{y_a y_a}, \underline{R}_{n_a n_a}\}$, and hence reduces to an EVD of $\underline{R}_{y_a y_a}$:

$$\underline{R}_{y_a y_a} = PAP^H \tag{70}$$

where P is a unitary matrix of eigenvectors and A is a diagonal matrix with the associated eigenvalues in descending order. The estimated RTF vector is then defined using the principal (first in this case) eigenvector, $P_{max}$:

$$\hat{h}_a = \frac{T_a L_a p_{max}}{\eta_p} \tag{71}$$

where the scaling $\eta_\rho$) $e_{a1}^T T_a L_a P_{max}$ and the M×1 vector $e_{a1} = [1\ 0\ \ldots\ 0]^T$.

This estimated RTF vector can now be used as an alternative to $h_a$ for the $MVDR_a$ defined in (25), and is given by:

$$\hat{w}_a = \frac{R_{n_a n_a}^{-1} \hat{h}_a}{\hat{h}_a^H R_{n_a n_a}^{-1} \hat{h}_a} \tag{72}$$

This filter based on estimated quantities cart also be reformulated in the pre-whitened-transformed domain. Starting with the definition of the pre-whitened-transformed version of $\hat{h}_a$:

$$\underline{\hat{h}}_a = L_a^{-1} T_a^H \hat{h}_a = \frac{p_{max}}{\eta_p} \tag{73}$$

Hence (72) becomes:

$$\hat{w}_a = T_a L_a^{-H} \underline{\hat{W}}_a \tag{74}$$

where $$\underline{\hat{w}}_a = \frac{\underline{\hat{h}}_a}{\underline{\hat{h}}_a^H \underline{\hat{h}}_a} = \eta_p^* p_{max} \tag{75}$$

Substitution of (74) into (32) yields the speech estimate as:

$$\hat{z}_{a,1} = \underline{\hat{w}}_a^H \underbrace{L_a^{-1} T_a^H y_a}_{\underline{y}_a} = \eta_p p_{max}^H \underline{y}_a \tag{76}$$

III. Appendix C—$MVDR_{a,e}$ with Partial a Priori Assumed RTF Vector and Partial Estimated RTF Vector Following the procedure as in (68), the transformation is firstly applied, also including the per term:

$$\min_{\hat{\Phi}_{x,r1}, \hat{h}_e} \left\|T^H\left(R_{yy} - R_{nn_\lambda}\right) - \hat{\Phi}_{x,r1} \begin{bmatrix} \tilde{h}_a \\ \hat{h}_e \end{bmatrix} [\tilde{h}_a^H \quad \hat{h}_e^H]) T\right\|_F^2 \tag{77}$$

after the pre-whitening operation can also be included in the optimisation problem:

$$\min_{\hat{\Phi}_{x,r1}, \hat{h}_e} \left\|\left(\underline{R}_{yy} - \underline{R}_{nn}\right) - L^{-1} T^H (\hat{\Phi}_{x,r1} \begin{bmatrix} \tilde{h}_a \\ \hat{h}_e \end{bmatrix} [\tilde{h}_a^H \quad \hat{h}_e^H]) T L^{-H}\right\|_F^2 \tag{78}$$

where $\underline{R}_{yy} = L^{-1} T^H R_{yy} T L^{-H}$ and $\underline{R}_{nn} = L^{-1} T^H R_{nn_\lambda} T L^{-H} = I_{(M_a+M_e)}$. Expansion of (78) then results in:

$$\min_{\hat{\Phi}_{x,r1}, \hat{h}_e} \left\| \left[\begin{array}{c|c} \underline{K}_A & \underline{K}_B \\ \hline \underline{K}_C & \underline{K}_{x+} \end{array}\right] - \left[\begin{array}{c|c} 0 & 0 \\ \hline 0 & \underline{K}_{x,r1} \end{array}\right] \right\|_F^2 \tag{79}$$

where the block dimensions are such that $\underline{K}_A$ is an $(M_a-1)\times(M_a-1)$ matrix. $\underline{K}_B$ an $(M_a-1)\times(M_e-1)$ matrix. $\underline{K}_c$ a $(M_e+1)\times(M_a-1)$ matrix and $\underline{K}_{x,r1}$ and $K_{x+}$ are $(M_e+1)\times(M_e+1)$ matrices realised as:

$$\underline{K}_{x,r1} = J^T \underline{\tilde{R}}_{x,r1} J \tag{80}$$

$$\underline{K}_{x+} = J^T \underline{R}_{yy} J - \underbrace{J^T \underline{R}_{nn} J}_{I_{(M_e+1)}} \tag{81}$$

where $\underline{\tilde{R}}_{x,r1} = L^{-1} T^H R_{x,r1} T L^{-H}$ and $J = [0_{(M_e+1)\times(M_a-1)} | I_{(M_e+1)}]^T$ is a selection matrix. It is then evident that $\underline{K}_x$: can essentially be constructed from the Last $(M_e+1)$ elements of the pre-whitened-transformed signals, namely that in relation to the last element of the LMA·$\underline{y}_a$,$M_a$, and those in relation to the XM signals—$\underline{y}_e$. Hence the first term of $\underline{K}_{x+}$ is equivalently:

$$J^T \underline{R}_{yy} J = \mathbb{E}\left\{\begin{bmatrix} \underline{Y}_a, M_a \\ \underline{y}_e \end{bmatrix} [\underline{y}_{a,Ma}^H \quad \underline{y}_e^H]\right\} \tag{82}$$

and similarly for the second term of $\underline{K}_{x+}$. It follows that (79) then reduces to the following $(M_e+1)\times(M_e+1)$ matrix approximation problem:

$$\min_{\hat{\Phi}_{x,r1}, \hat{h}_e} \left\|\underline{K}_{x+} - \underline{K}_{x,r1}\right\|_F^2 \tag{83}$$

The solution then follows from the GEVD on the matrix pencil $\{J^T \underline{R}_{yy} J, J^T \underline{R}_{nn} J\}$ and hence reduces to an EVD of $J^T \underline{R}_{yy} J$:

$$J^T \underline{R}_{yy} J = V \Gamma V^H \tag{84}$$

where V is a $(M_e+1)\times(M_e+1)$ unitary matrix of eigenvectors and F is a diagonal matrix with the associated eigenvalues in descending, order. The estimated RTF vector for the XM signals is then defined from the corresponding principal (first in this case) eigenvector $v_{max}$:

$$\hat{h}_e = \frac{\|\tilde{h}_a\|}{l_{M_a} v_1} J_e^T TLJ v_{max} \tag{85}$$

where the selection matrix, $J_e=[0_{(M_e \times M_a)}|I_{M_e}]^T$.

Finally, this estimate is then used to compute the corresponding $MVDR_{a,e}$ filter with an a priori assumed RTF vector and a partially estimated RTF vector, along with the penalty term as:

$$\tilde{w} = \frac{R_{nn}^{-1}\tilde{h}}{\tilde{h}^H R_{nn}^{-1}\tilde{h}} \tag{86}$$

where $\tilde{h}$ as defined in (44) can be equivalently represented as:

$$\tilde{h} = \frac{\|\tilde{h}_a\|}{l_{M_a} v_1} TLJ v_{max} \tag{87}$$

This filter can also be realised in the pre-whitened-transformed domain. The pre tend-transformed version of $\tilde{h}$ can firstly be considered where:

$$\underline{\tilde{h}} = L^{-1}T^H\tilde{h} = \frac{\|\tilde{h}_a\|}{l_{M_a} v_1} J v_{max} = \frac{\|\tilde{h}_a\|}{l_{M_a} v_1}\begin{bmatrix} 0 \\ \vdots \\ 0 \\ v_1 \\ v_e \end{bmatrix} \tag{88}$$

Therefore, (86) can be re-written as:

$$\tilde{w}=TL^{-H}\underline{\tilde{w}} \tag{89}$$

where:

$$\underline{\tilde{w}} = \frac{\underline{\tilde{h}}}{\underline{\tilde{h}}^H \underline{\tilde{h}}} = \begin{bmatrix} 0 \\ 0 \\ \vdots \\ \underline{\tilde{w}}_{\lambda,v} \end{bmatrix} = \frac{l_{M_a} v_1^*}{\|\tilde{h}_a\|}\begin{bmatrix} 0 \\ \vdots \\ 0 \\ v_1 \\ v_e \end{bmatrix} \tag{90}$$

Therefore, the corresponding speech estimate will be:

$$\tilde{z}_1 = \underline{\tilde{w}}^H \underbrace{L^{-1}T^H y}_{\underline{y}} = \frac{l_{M_a} v_1}{\|\tilde{h}_a\|} v_{max}^H \begin{bmatrix} \underline{y}_{a,M_a} \\ \underline{y}_e \end{bmatrix} \tag{91}$$

IV. Appendix D—with Estimated RTF Vector

Once again, it will be convenient to re-fame the problem in the pre-whitened-transformed domain similarly to (78):

$$\min_{\hat{R}_{x,r1}} \| \underline{R}_{yy} - \underline{R}_{nn} \Big) - L^{-1}T^H\left(\hat{\Phi}_{x,r1}\begin{bmatrix} \hat{q}_a \\ \hat{q}_e \end{bmatrix}\left[\hat{q}_a^H \hat{q}_e^H\right]\right)TL^{-H} \|_F^2 \tag{92}$$

In this case however, the problem cannot be reduced to a lower order as the entire RTF vector is being estimated. Hence the solution follows from an EVD on $\underline{R}_{yy}$:

$$\underline{R}_{yy}=Q\Sigma Q^H \tag{93}$$

where Q is a $(M_a+M_e)\times(M_a+M_e)$ unitary matrix of eigenvectors and $\Sigma$ is a diagonal matrix with the associated eigenvalues in descending order. The estimated RTF vector is then given by the principal (first in this case) eigenvector, $q_{max}$:

$$\hat{h} = \begin{bmatrix} \hat{q}_a \\ \hat{q}_e \end{bmatrix} = \frac{TLq_{max}}{\eta_q} \tag{94}$$

where $\eta_q=e_{x1}^T TL\, q_{max}$ and $e_{x1}=[1\ 0\ \ldots\ 0|0\ \ldots\ 0]^T$.

The estimated RIF vector can therefore be used as an alternative to $\tilde{h}$ for the $MVDR_{a,e}$:

$$\hat{w} = \frac{R_{nn}^{-1}\hat{h}}{\hat{h}^H R_{nn}^{-1}\hat{h}} \tag{95}$$

This filter based on estimated quantities can also be reformulated in the pre-whitened-transformed domain. Starting with the definition for the pre-whitened-transformed version of this estimated RTF:

$$\underline{\hat{h}} = L^{-1}T^H\hat{h} = \frac{q_{max}}{\eta_q} \tag{96}$$

Hence (95) becomes:

$$\hat{w}=TL^{-H}\underline{\hat{w}} \tag{97}$$

where $$\underline{\hat{w}} = \frac{\underline{\hat{h}}}{\underline{\hat{h}}^H \underline{\hat{h}}} = \eta_q^* q_{max} \tag{98}$$

The corresponding speech estimate using the estimated RTF vector is therefore:

$$\begin{aligned} \hat{z}_1 &= \underline{\hat{w}}^H \underbrace{L^{-1}T^H y}_{\underline{y}} \\ &= \eta_q q_{max}^H \underline{y} \end{aligned} \tag{99}$$

What is claimed is:

1. A method, comprising:

receiving sound signals with at least a local microphone array of a device, wherein the sound signals comprise at least one target sound;

generating an a priori estimate of the at least one target sound in the received sound signals, wherein the a priori estimate is based at least on a predetermined location of a source of the at least one target sound;

generating a direct estimate of the at least one target sound in the received sound signals, wherein the direct estimate is based at least on a real-time estimate of a location of a source of the at least one target sound; and generating a weighted combination of the a priori estimate and the direct estimate, wherein the weighted combination is an integrated estimate of the target sound.

2. The method of claim 1, wherein generating the a priori estimate of the at least one target sound in the received sound signal, comprises:

generating the a priori estimate using only an a priori relative transfer function (RTF) vector generated from the received sound signals.

3. The method of claim 1, wherein generating the direct estimate of the at least one target sound in the received sound signals, comprises:

generating the direct estimate using only an estimated relative transfer function (RTF) vector for the received sound signals.

4. The method of claim 1, wherein generating the weighted combination of the a priori estimate of the at least one target sound and the direct estimate of the at least one target sound, comprises:

weighting the a priori estimate in accordance with a first cost function controlled by a first set of tuning parameters to generate a weighted a priori estimate;

weighting the direct estimate in accordance with a second cost function controlled by a second set of tuning parameters to generate a weighted direct estimate; and mixing the weighted direct estimate with the weighted a priori estimate.

5. The method of claim 4, further comprising:

setting the first set of tuning parameters based on one or more confidence measures associated with the a priori estimate of the of the at least one target sound, wherein the one or more confidence measures represent an estimate of a reliability of the a priori estimate.

6. The method of claim 4, further comprising:

setting the second set of tuning parameters based on one or more confidence measures associated with the direct estimate of the of the at least one target sound, wherein the one or more confidence measures represent an estimate of a reliability of the direct estimate.

7. The method of claim 1, wherein generating the a priori estimate of the at least one target sound in the received sound signal, comprises:

generating the a priori estimate based at least on the predetermined location of a source of the at least one target sound, one or more assumptions regarding characteristics of the local microphone array, and one or more assumptions regarding reverberant characteristics of the at least one target sound.

8. The method of claim 1, wherein generating the direct estimate of the at least one target sound in the received sound signals, comprises:

generating the direct estimate based at least on a real-time estimate of a location of a source of the at least one target sound, estimated characteristics of the local microphone array, and estimated reverberant characteristics of the at least one target sound.

9. The method of claim 1, further comprising:

performing subsequent sound processing operations in the device using the integrated estimate of the target sound.

10. The method of claim 1, wherein receiving the sound signals with at least a local microphone array of a device, comprises:

receiving a first portion of the sound signals with the local microphone array of the device; and receiving a second portion of the sound signals with at least one external microphone.

11. The method of claim 10, wherein generating the a priori estimate of the at least one target sound in the received sound signals, comprises:

generating the a priori estimate using both the first portion of the sound signals and the second portion of the sound signals in accordance with at least the predetermined location of the source of the at least one target sound.

12. The method of claim 10, wherein generating the direct estimate of the at least one target sound in the received sound signals, comprises:

generating the direct estimate using both the first portion of the sound signals and the second portion of the sound signals in accordance with at least the real-time estimate of the location of the source of the at least one target sound.

13. A device, comprising:

a local microphone array configured to receive sound signals, wherein the sound signals comprise at least one target sound; and one or more processors configured to:

generate an a priori estimate of the at least one target sound in the received sound signals using only an a priori relative transfer function (RTF) vector generated from the received sound signals, generate a direct estimate of the at least one target sound in the received sound signals using only an a priori relative transfer function (RTF) vector generated from the received sound signals, and generate a weighted combination of the a priori estimate and the direct estimate, wherein the weighted combination is an integrated estimate of the target sound.

14. The device of claim 13, wherein to generate the weighted combination of the a priori estimate of the at least one target sound and the direct estimate of the at least one target sound, the one or more processors are configured to:

weight the a priori estimate in accordance with a first cost function controlled by a first set of tuning parameters to generate a weighted a priori estimate;

weight the direct estimate in accordance with a second cost function controlled by a second set of tuning parameters to generate a weighted direct estimate; and mix the weighted direct estimate with the weighted a priori estimate.

15. The device of claim 14, wherein the one or more processors are configured to:

set the first set of tuning parameters based on one or more confidence measures associated with the a priori estimate of the of the at least one target sound, wherein the one or more confidence measures represent an estimate of a reliability of the a priori estimate.

16. The device of claim 14, wherein the one or more processors are configured to:

set the second set of tuning parameters based on one or more confidence measures associated with the direct estimate of the of the at least one target sound, wherein the one or more confidence measures represent an estimate of a reliability of the direct estimate.

17. The device of claim 13, wherein to generate the a priori estimate of the at least one target sound in the received sound signal, the one or more processors are configured to:

generate the a priori estimate based at least on a predetermined location of a source of the at least one target sound, one or more assumptions regarding characteristics of the local microphone array, and one or more assumptions regarding reverberant characteristics of the at least one target sound.

18. The device of claim 13, wherein to generate the direct estimate of the at least one target sound in the received sound signals, the one or more processors are configured to:

generate the direct estimate based at least on a real-time estimate of a location of a source of the at least one target sound, estimated characteristics of the local microphone array, and estimated reverberant characteristics of the at least one target sound.

19. The device of claim 13, wherein the one or more processors are configured to:

perform subsequent sound processing operations in the device using the integrated estimate of the target sound.

20. A system including the device of claim 13, wherein the local microphone array is configured to receive a first portion of the sound signals, and wherein the system comprises:

at least one external microphone configured to receive a second portion of the sound signals.

* * * * *